US012222091B2

(12) United States Patent
Yasuda et al.

(10) Patent No.: US 12,222,091 B2
(45) Date of Patent: Feb. 11, 2025

(54) ILLUMINATION SYSTEM, LIGHT, AND HOLDER

(71) Applicant: MAKITA CORPORATION, Anjo (JP)

(72) Inventors: Isao Yasuda, Anjo (JP); Louie Siu Heng Chan, Dongguan (CN)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/460,850

(22) Filed: Sep. 5, 2023

(65) Prior Publication Data

US 2024/0085004 A1 Mar. 14, 2024

(30) Foreign Application Priority Data

Sep. 13, 2022 (JP) ................................ 2022-145396

(51) Int. Cl.

| | |
|---|---|
| ***F21V 21/116*** | (2006.01) |
| ***F21L 4/04*** | (2006.01) |
| ***F21L 4/08*** | (2006.01) |
| ***F21V 21/088*** | (2006.01) |
| ***F21V 21/40*** | (2006.01) |
| *F21Y 103/20* | (2016.01) |

(52) U.S. Cl.

CPC ............... *F21V 21/116* (2013.01); *F21L 4/04* (2013.01); *F21L 4/08* (2013.01); *F21V 21/088* (2013.01); *F21V 21/406* (2013.01); *F21Y 2103/20* (2016.08)

(58) Field of Classification Search

CPC .... F21V 21/116; F21V 21/088; F21V 21/406; F21L 4/04; F21L 4/08

See application file for complete search history.

(56) References Cited

U.S. PATENT DOCUMENTS

| | | | | |
|---|---|---|---|---|
| 10,753,553 | B2 * | 8/2020 | Gross | F21K 9/65 |
| 2008/0117644 | A1 * | 5/2008 | Li | F21L 4/00 362/496 |
| 2018/0111547 | A1 * | 4/2018 | Gall | F21L 4/08 |
| 2019/0234587 | A1 * | 8/2019 | Ohara | F21V 21/406 |
| 2020/0300446 | A1 * | 9/2020 | Sergyeyenko | F21V 21/0965 |

FOREIGN PATENT DOCUMENTS

| | | |
|---|---|---|
| CN | 207501010 U | 6/2018 |

* cited by examiner

*Primary Examiner* — Evan P Dzierzynski
*Assistant Examiner* — Nathaniel J Lee
(74) *Attorney, Agent, or Firm* — Oliff PLC

(57) ABSTRACT

An illumination system includes a light and a holder. The light includes: an illumination part from which light is emitted; a fixing part connected to the illumination part; and a battery mounting part to and from which a battery pack is attached and detached. The holder includes: a holder body; an attachment part connected to the holder body and to be attached to a subject; and an annular clamp unit connected to the holder body and disposed around the fixing part.

15 Claims, 26 Drawing Sheets

ILLUMINATION SYSTEM, LIGHT, AND HOLDER

CROSS-REFERENCE TO RELATED APPLICATION(S)

The present application claims priority to and incorporates by reference the entire contents of Japanese Patent Application No. 2022-145396 filed in Japan on Sep. 13, 2022.

BACKGROUND OF THE INVENTION

1. Field of the Invention

Techniques disclosed herein relate to an illumination system, a light, and a holder.

2. Description of the Related Art

In the technical field related to illumination systems, a pull rod lamp system as disclosed in Chinese Utility Model No. 207501010 is known. In Chinese Utility Model No. 207501010, the pull rod lamp system (illumination system) includes a fixed bracket (holder) to which a pull rod lamp (light) is fixed.

A light on which a battery pack is mounted is heavy in weight. There is a demand for techniques for stably holding a heavy light.

It is one non-limiting object of the present teachings to disclose techniques for stably holding a light.

SUMMARY OF THE INVENTION

The present teachings disclose an illumination system. The illumination system may include a light and a holder. The light may include: an illumination part from which light is emitted; a fixing part connected to the illumination part; and a battery mounting part to and from which a battery pack is attached and detached. The holder may include: a holder body; an attachment part connected to the holder body and to be attached to a subject; and an annular clamp unit connected to the holder body and disposed around the fixing part.

DETAILED DESCRIPTION OF THE PREFERRED EMBODIMENTS

Figure 1:
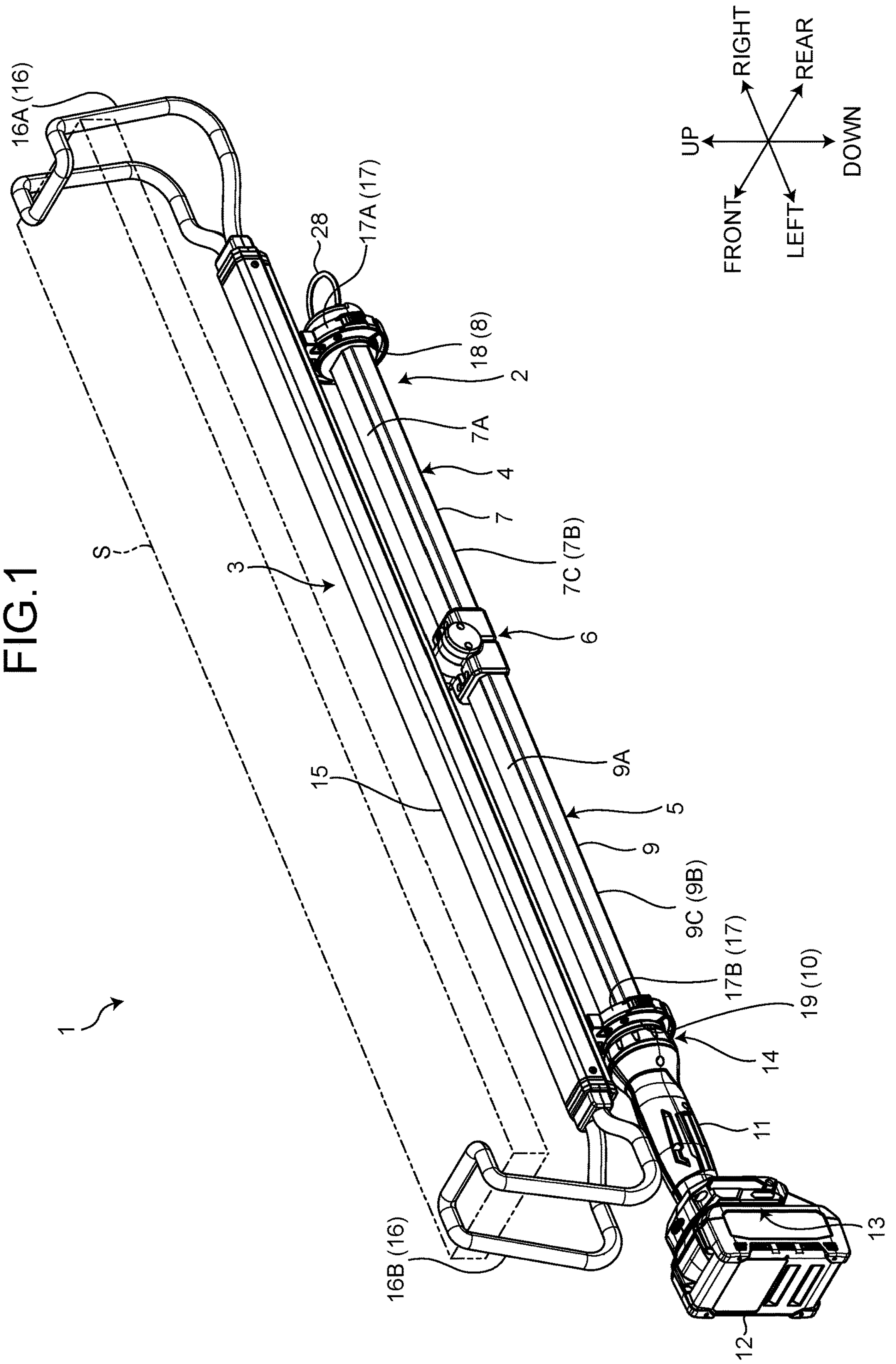
FIG. 1 is a perspective view illustrating an illumination system according to an embodiment.

The present teachings discloses an illumination system. The illumination system may include a light and a holder. The light may include: an illumination part from which light is emitted; a fixing part connected to the illumination part; and a battery mounting part to and from which a battery pack is attached and detached. The holder may include: a holder body; an attachment part connected to the holder body and to be attached to a subject; and an annular clamp unit connected to the holder body and disposed around the fixing part.

In the above structure, since the clamp unit of the holder is annular, the clamp unit is disposed around the fixing part of the light. As a result, the holder can stably hold the light that is heavy in weight when the battery pack is attached thereto. The subject to which the attachment part is attached is, for example, a hood (bonnet), a rear hatch, or a roof of an automobile, between cargo beds of a truck, between pipes, or a shelf.

In one or more embodiments, the fixing part of the light may be connected to an end of the illumination part.

In the above structure, the light emitted from the illumination part is prevented from being blocked by the fixing part.

In one or more embodiments, the light may include a handle unit. The fixing part may be disposed between the illumination part and the handle unit. The illumination system may include a plurality of the fixing parts. The fixing parts may be connected to the illumination part. At least one of the fixing parts may be disposed between the illumination part and the handle unit.

In the above structure, a user can grip the handle unit while the fixing part of the light is held by the clamp unit of the holder.

In one or more embodiments, the clamp unit may include a base part, an arm, a lock lever, and a spring. The base part may be disposed at a part of the circumference of the fixing part. The arm may be turnably connected to one end of the base part. The lock lever may be movably supported by the other end of the base part. The lock lever may lock the arm. The spring may apply an elastic force to the lock lever. The lock lever may be movable between a lock position at which the arm is locked and a release position at which the arm is unlocked. The spring may apply an elastic force to the lock lever in such a manner that the locking lever moves towards the lock position.

In the above structure, with the lock lever operated so as to move from the lock position to the release position against the elastic force of the spring, the lock of the arm is released, and an opening of the base part is opened. The user can insert the fixing part into the base part or remove the fixing part from the base part via the opening of the base part. In order that the fixing part is held by the clamp unit, the arm is operated so as to be pushed into the base part after the fixing part is inserted into the base part. With the arm operated so as to be pushed into the base part, the lock lever is pushed together with the arm toward the release position. Since the spring applies the elastic force to the lock lever in such a manner that the lock lever moves toward the lock position, the lock lever is pushed toward the release position together with the arm and then moves toward the lock position by the elastic force of the spring. As a result, the arm is automatically locked by the lock lever.

In one or more embodiments, the light may include a rotation unit that connects the illumination part and the battery mounting part in a relatively rotatable manner.

In the above structure, the orientation of the illumination part can be changed without changing the orientation of the battery pack. The emission direction of light emitted from the illumination part can be changed without changing the orientation of the battery pack.

In one or more embodiments, the attachment part of the holder may include a first attachment part and a second attachment part. The holder may include an extendable unit that connects the first attachment part and the second attachment part in a relatively movable manner.

In the above structure, since the relative distance between the first attachment part and the second attachment part can be changed, the first attachment part and the second attachment part can be attached to subjects of various sizes.

In one or more embodiments, the illumination part may include a first illumination part and a second illumination part. The fixing part may include a first fixing part and a second fixing part. The light may include: a first light unit including the first illumination part and the first fixing part; a second light unit including the second illumination part, the second fixing part, and a battery mounting part; and a bent unit that connects the first light unit and the second light unit in a relatively turnable manner.

In the above structure, the first light unit and the second light unit turn relatively to each other, and thus the light can be used in various use forms.

In one or more embodiments, the battery pack may be attached to or detached from the battery mounting part by being moved in a direction parallel to a predetermined attachment/detachment axis with respect to the battery mounting part. The rotation axis of the rotation unit and the attachment/detachment axis may be orthogonal to each other.

In the above structure, for example, even when the rotation angle of the rotation unit changes, the battery pack can be smoothly attached to and detached from the battery mounting part.

In one or more embodiments, the battery pack may be attached to or detached from the battery mounting part by being moved in a direction parallel to a predetermined attachment/detachment axis with respect to the battery mounting part. The turning axis of the bent unit and the attachment/detachment axis may be orthogonal to each other.

In the above structure, for example, even when the turning angle of the bent unit changes, the battery pack can be smoothly attached to and detached from the battery mounting part.

In one or more embodiments, the illumination part may include a first illumination part and a second illumination part. The fixing part may include a first fixing part and a second fixing part. The light may include: a first light unit including the first illumination part and the first fixing part; a second light unit including the second illumination part, the second fixing part, a battery mounting part, and a handle unit; and a bent unit that connects the first light unit and the second light unit in a relatively turnable manner. A strap hook may be provided to each of (i) a non-illumination part of the first light unit including the first fixing part, (ii) the bent unit, and (iii) the handle unit.

In the above structure, since the light is provided with the strap hooks, the light can be strapped. Moreover, since the strap hooks are provided to each of (i) the non-illumination part of the first light unit, (ii) the bent unit, and (iii) the handle unit, the light can be strapped in various use forms.

In one or more embodiments, the light may include: a non-illumination part connected to an end of the illumination part; and a suspension hook turnably connected to the non-illumination part.

In the above structure, the light can be suspended from a subject.

In one or more embodiments, the light may include flange parts provided at both ends of the fixing part.

In the above structure, the fixing part and the clamp unit are positioned by the clamp unit disposed around the fixing part, the clamp unit abutting on the flange parts. Moreover, the clamp unit is hardly detached from the fixing part.

The present teachings disclose an illumination system. The illumination system may include a fixing member that fixes a light and a tripod. The fixing member may fix the light hung on a first portion of the tripod and a second portion of the tripod. The fixing member may include: a light holding part that holds at least a part of the light having a suspension hook to be hung on the first portion of the tripod; and a tripod attaching part to be attached to the second portion of the tripod.

In the above structure, the long light can be stably hung on the tripod. The fixing member suppresses swinging of the light hung on the first portion of the tripod.

In one or more embodiments, the second portion may include a pole of the tripod. The tripod attaching part may include a tripod opening into which the pole is inserted.

In the above structure, since the tripod attaching part includes a recess including the tripod opening, the pole can be easily attached to and detached from the tripod attaching part.

In one or more embodiments, the light may include: an illumination part from which light is emitted; and a fixing part connected to an end of the illumination part. The light holding part may include a light opening through which the fixing part is inserted.

In the above structure, since the light holding part includes a recess including the light opening, the fixing part of the light can be easily attached to and detached through the light holding part.

In one or more embodiments, the light may include: an illumination part from which light is emitted; and a fixing part connected to an end of the illumination part. The light holding part may have an annular shape that surrounds the fixing part.

In the above structure, since the light holding part has an annular shape to surround the fixing part of the light, the fixing part of the light hardly comes off from the light holding part.

In one or more embodiments, the light holding part may include: a base part to be disposed at a part of the circumference of the fixing part; an arm turnably connected to one end of the base part; a lock lever that is movably supported by the other end of the base part and is capable of locking the arm; and a spring that applies an elastic force to the lock lever. The lock lever may be movable between a lock position at which the arm is locked and a release position at which the arm is unlocked. The spring may apply an elastic force to the lock lever in such a manner that the locking lever moves towards the lock position.

In the above structure, with the lock lever operated so as to move from the lock position to the release position against the elastic force of the spring, the lock of the arm is released, and an opening of the base part is opened. The user can insert the fixing part into the base part or remove the fixing part from the base part via the opening of the base part. In order that the fixing part is held by the light holding part, the arm is operated to so as to be pushed into the base part after the fixing part is inserted into the base part. With the arm operated so as to be pushed into the base part, the lock lever is pushed together with the arm toward the release position. Since the spring applies the elastic force to the lock lever in such a manner that the lock lever moves toward the lock position, the lock lever is pushed toward the release position together with the arm and then moves toward the lock position by the elastic force of the spring. As a result, the arm is automatically locked by the lock lever.

In one or more embodiments, a plurality of light holding parts may be provided.

In the above structure, a plurality of lights and the tripod can be simultaneously fixed.

In one or more embodiments, the light holding part may be disposed on opposite sides of the tripod attaching part.

In the above structure, the plurality of lights arranged on both sides of the tripod and the tripod can be simultaneously fixed.

In one or more embodiments, a light opening of a first light holding part and a light opening of a second light holding part may face in mutually opposite directions. The tripod opening of the tripod attaching part may face in a direction different from those of the light opening of the first light holding part and the light opening of the second light holding part.

In the above structure, it is possible to smoothly perform attachment and detachment of the tripod and attachment and detachment of the plurality of lights to and from the fixing member.

In one or more embodiments, the light may include: an illumination part from which light is emitted; a first non-illumination part connected to one end of the illumination part; and a second non-illumination part connected to the other end of the illumination part. The suspension hook may be connected to the first non-illumination part. The light holding part may hold a fixing part provided in the second non-illumination part.

In the above structure, one end of the light is suspended from the tripod, and the other end of the light is fixed to the tripod by the fixing member, and thus the light hung from the tripod is prevented from swinging.

In one or more embodiments, the light may have a handle unit. The light holding part may hold a fixing part disposed between the illumination part and the handle unit.

In the above structure, a user can grip the handle unit while the fixing part of the light is held by the light holding part of the fixing member.

In one or more embodiments, the light may include flange parts provided at both ends of the fixing part. The light holding part may hold the fixing part between one of the flange parts and the other flange part.

In the above structure, the fixing part and the fixing member are positioned with the light holding part disposed around the fixing part abutting on the flange parts. Moreover, the fixing member hardly comes off from the fixing part.

In one or more embodiments, the light may include a battery mounting part provided at one end of the handle unit, the battery mounting part to and from which a battery pack is attached and detached. The light holding part may hold a fixing part connected to the other end of the handle unit.

In the above structure, a user can grip the handle unit or attach and detach the battery pack to and from the battery mounting part in a state where the fixing part of the light is held by the light holding part of the fixing member.

Hereinafter, embodiments according to the present disclosure will be described with reference to the drawings, however, the present disclosure is not limited to the embodiments. The components of the embodiments described below can be combined as appropriate. In some cases, some components are not used.

In the embodiments, the positional relationship of units will be described using terms of "front", "rear", "left", "right", "up", and "down". These terms indicate directions at a time of using the illumination system 1. Furthermore, a virtual axis extending in the front-rear direction is referred to as a front-rear axis as appropriate, a virtual axis extending in the left-right direction is referred to as a left-right axis as appropriate, and a virtual axis extending in the up-down direction is referred to as a vertical axis as appropriate. The front-rear axis and the left-right axis are orthogonal to each other. The left-right axis and the vertical axis are orthogonal to each other. The vertical axis and the front-rear axis are orthogonal to each other.

Figure 2:
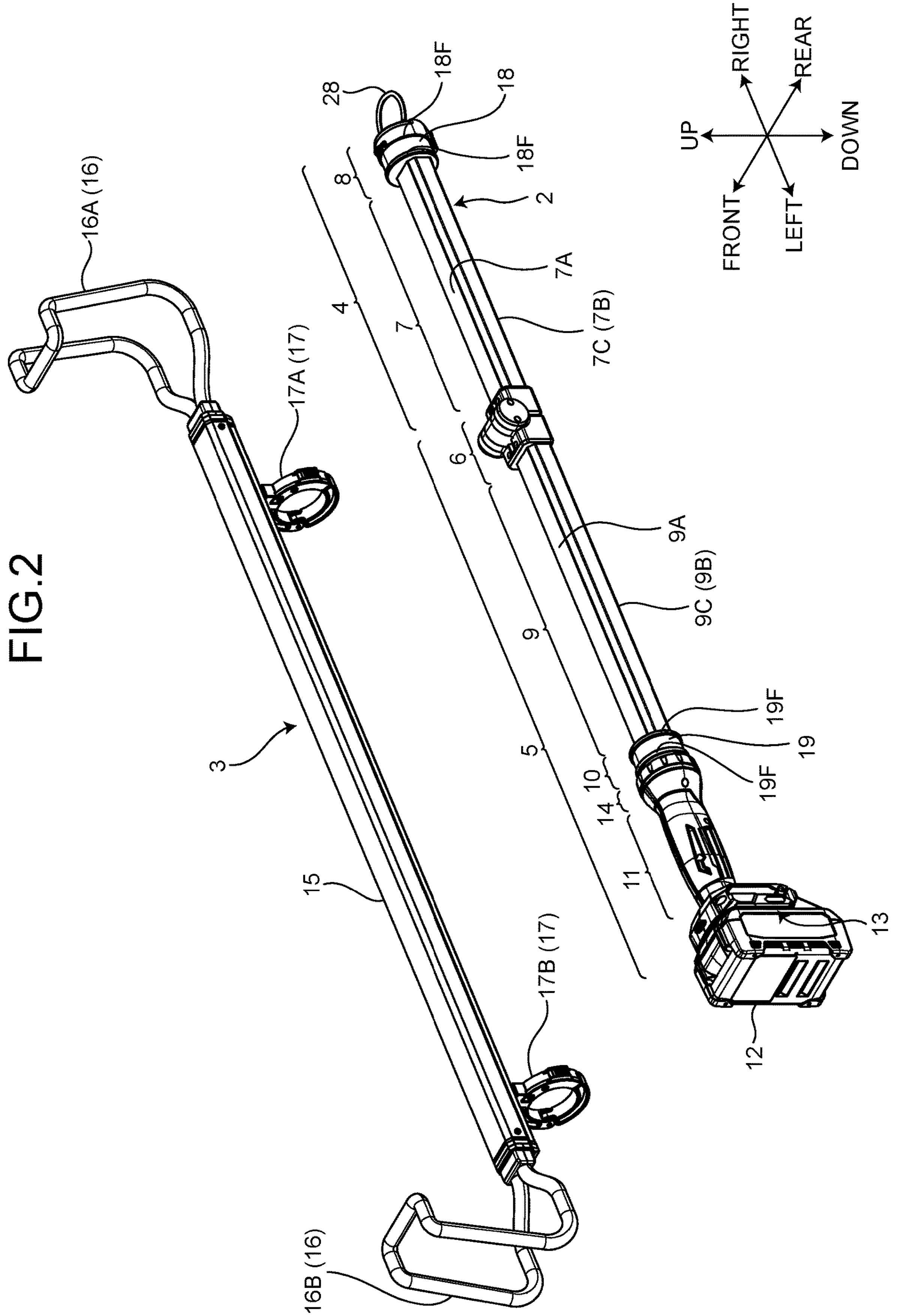
FIG. 2 is an exploded perspective view illustrating the illumination system according to the embodiment.

Overview of Illumination System FIG. 1 is a perspective view illustrating an illumination system 1 according to an embodiment. FIG. 2 is an exploded perspective view illustrating the illumination system 1 according to the embodiment. The illumination system 1 includes a light 2 and a holder 3 for releasably holding the light 2.

The light 2 is a bar-shaped light elongated in a predetermined direction. In the example illustrated in FIGS. 1 and 2, the light 2 is long in the left-right direction. The light 2 includes a first light unit 4, a second light unit 5, and a bent unit 6.

The first light unit 4 includes an illumination part 7 (first illumination part) and a non-illumination part 8. Light is emitted from the illumination part 7. No light is emitted from the non-illumination part 8. The non-illumination part 8 is connected to at least a part of the illumination part 7. In the example illustrated in FIGS. 1 and 2, the non-illumination part 8 is connected to the right end of the illumination part 7.

The second light unit 5 includes an illumination part 9 (second illumination part), a non-illumination part 10, a handle unit 11, a battery mounting part 13, and a rotation unit 14. Light is emitted from the illumination part 9. No light is emitted from the non-illumination part 10. The non-illumination part 10 is connected to at least a part of the illumination part 9. In the example illustrated in FIGS. 1 and 2, the non-illumination part 10 is connected to the left end of the illumination part 9. The handle unit 11 is gripped by a user of the illumination system 1. The handle unit 11 is connected to the left end of the non-illumination part 10. In the left-right direction, the non-illumination part 10 is disposed between the illumination part 9 and the handle unit 11. A battery pack 12 is attached to and detached from the battery mounting part 13. The battery pack 12 is a battery pack for a power tool. The battery mounting part 13 is provided at the left end of the handle unit 11. The rotation unit 14 connects the illumination part 9 and the battery mounting part 13 in a relatively rotatable manner. In the example illustrated in FIGS. 1 and 2, a rotation axis CX of the rotation unit 14 extends in the left-right direction. In the embodiment, the rotation unit 14 connects the illumination part 9 and the handle unit 11 provided with the battery mounting part 13 in a relatively rotatable manner.

The bent unit 6 connects the left end of the first light unit 4 and the right end of the second light unit 5. The bent unit 6 connects the first light unit 4 and the second light unit 5 in a relatively turnable manner. In FIGS. 1 and 2, a turning axis AX of the bent unit 6 extends in the front-rear direction.

The illumination part 7 includes: a housing 7A; an optical member 7C having a light emitting plane 7B; and a light emitting element (not illustrated) disposed in a first internal space defined by the housing 7A and the optical member 7C. The light emitting element is, for example, a light emitting diode (LED). The light emitting element of the illumination part 7 is mounted on a circuit board in the first internal space. Light emitted from the light emitting element of the illumination part 7 passes through the optical member 7C and is emitted from the light emitting plane 7B. In FIGS. 1 and 2, the light emitting plane 7B faces downward.

The illumination part 9 includes: a housing 9A; an optical member 9C having a light emitting plane 9B; and a light emitting element (not illustrated) disposed in a second internal space defined by the housing 9A and the optical member 9C. The light emitting element is, for example, a light emitting diode (LED). The light emitting element of the illumination part 9 is mounted on a circuit board in the second internal space. Light emitted from the light emitting element of the illumination part 9 passes through the optical member 9C and is emitted from the light emitting plane 9B. In FIGS. 1 and 2, the light emitting plane 9B faces downward.

The holder 3 includes a holder body 15, attachment parts 16, and annular clamp units 17.

The holder body 15 is a rod-shaped member that is long in the left-right direction.

The attachment parts 16 are connected to the holder body 15. The attachment parts 16 are attached to a predetermined subject S. The attachment parts 16 each include a hook to be hooked on a subject. The attachment parts 16 include a first attachment part 16A disposed at the right end of the holder body 15 and a second attachment part 16B disposed at the left end of the holder body 15.

The subject S to which the attachment parts 16 are attached is, for example, a hood (bonnet), a rear hatch, or a roof of an automobile, between cargo beds of a truck, between pipes, or a shelf.

The clamp units 17 are connected to the holder body 15. The clamp units 17 hold at least a part of the light 2. In the embodiment, the clamp units 17 includes a first clamp unit 17A that holds at least a part of the first light unit 4 and a second clamp unit 17B that holds at least a part of the second light unit 5.

The first clamp unit 17A holds a fixing part 18 provided in the non-illumination part 8 of the first light unit 4. The fixing part 18 has a substantially columnar or cylindrical shape. The fixing part 18 is connected to the right end of the illumination part 7. The first clamp unit 17A is disposed around the fixing part 18.

The second clamp unit 17B holds a fixing part 19 provided in the non-illumination part 10 of the second light unit 5. The fixing part 19 has a substantially columnar or cylindrical shape. The fixing part 19 is connected to the left end of the illumination part 9. The second clamp unit 17B is disposed around the fixing part 19. In the left-right direction, the fixing part 19 is disposed between the illumination part 9 and the handle unit 11.

Flange parts 18F are provided at both of the right end and the left end of the fixing part 18. The first clamp unit 17A holds the fixing part 18 between one of the flange parts 18F and the other flange part 18F. The right end surface and the left end surface of the first clamp unit 17A can be each brought into contact with one of the flange parts 18F. The fixing part 18 and the first clamp unit 17A are positioned in the left-right direction by the flange parts 18F.

Flange parts 19F are provided at both of the right end and the left end of the fixing part 19. The second clamp unit 17B holds the fixing part 19 between one of the flange parts 19F and the other flange part 19F. The right end surface and the left end surface of the second clamp unit 17B can be each brought into contact with one of the flange parts 19F. The fixing part 19 and the second clamp unit 17B are positioned in the left-right direction by the flange parts 19F.

Clamp Unit

Figure 3:
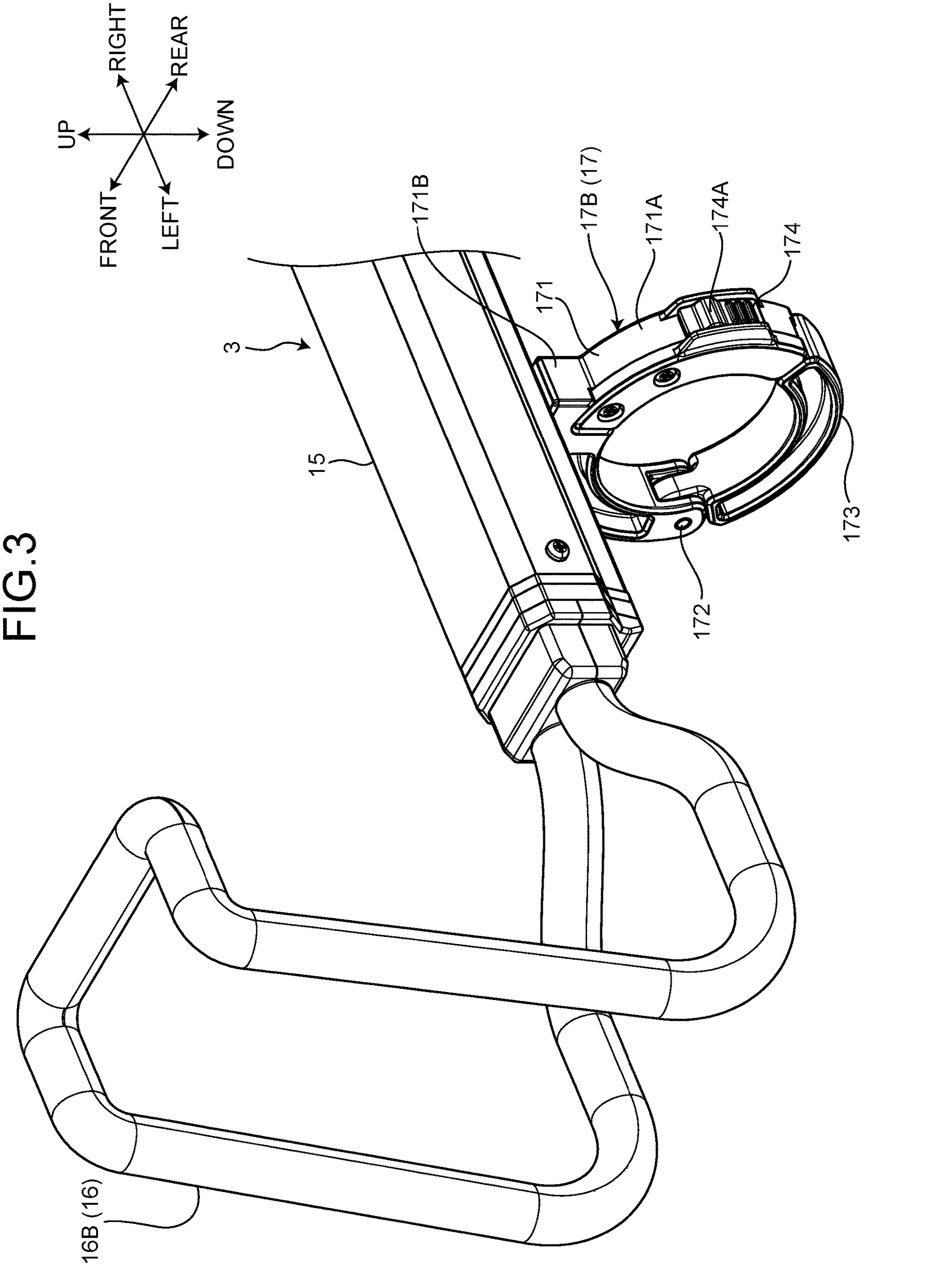
FIG. 3 is a perspective view illustrating a second clamp unit and a second attachment part of the embodiment.
Figure 4:
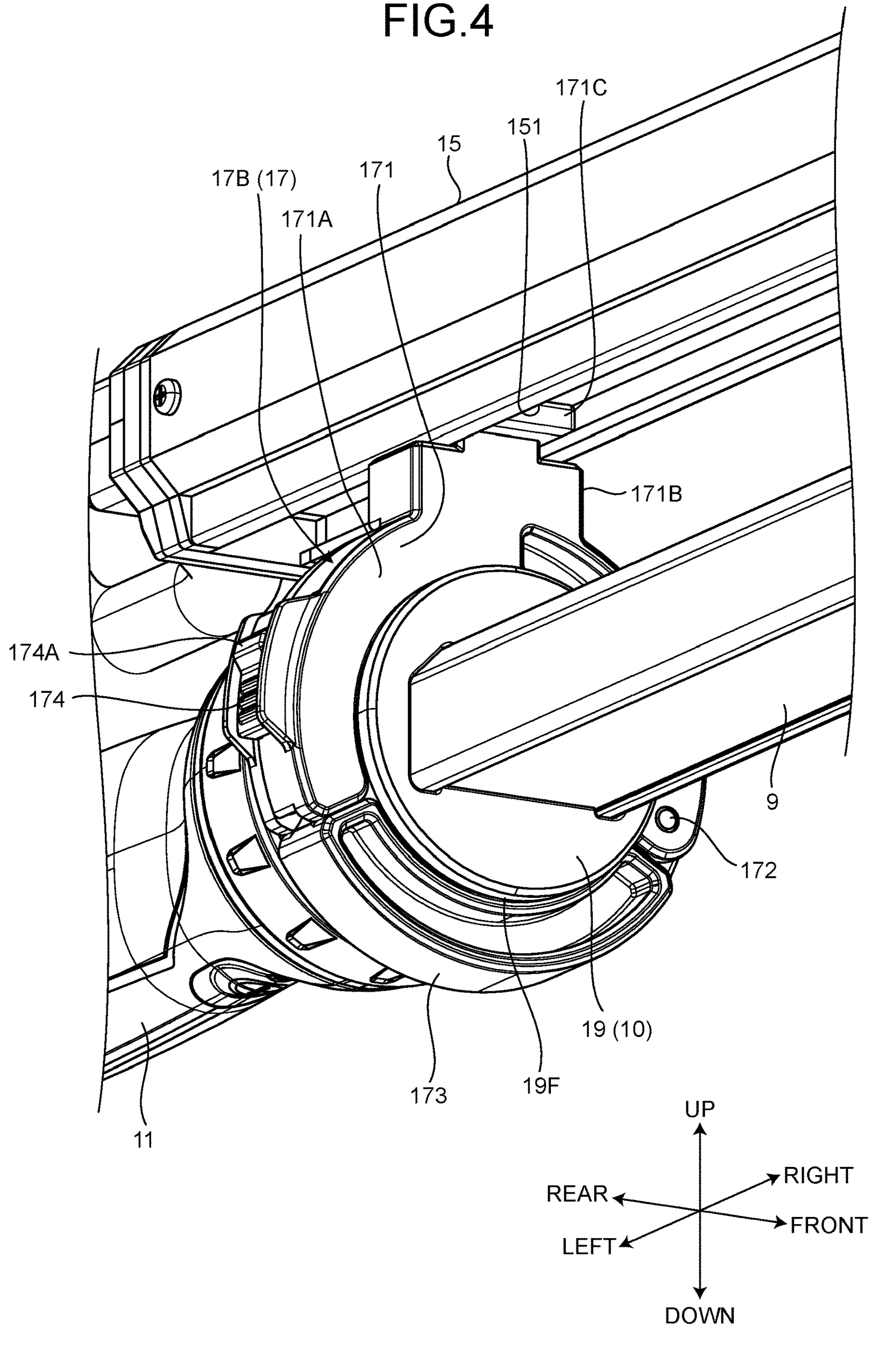
FIG. 4 is a perspective view illustrating the second clamp unit of the embodiment.
Figure 5:
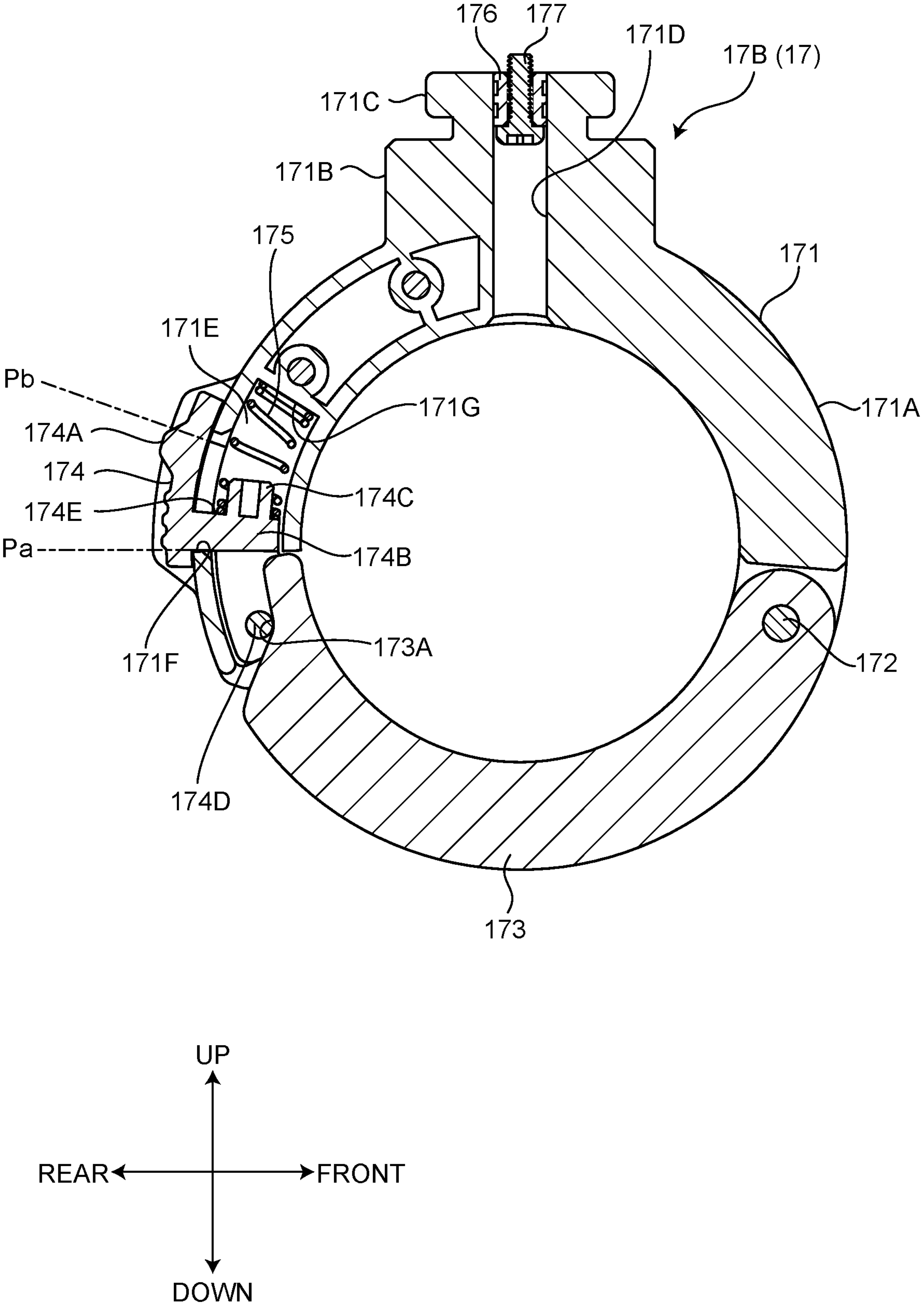
FIG. 5 is a cross-sectional view illustrating the second clamp unit of the embodiment.

FIG. 3 is a perspective view illustrating the second clamp unit 17B and the second attachment part 16B of the embodiment. FIG. 4 is a perspective view illustrating the second clamp unit 17B of the embodiment. FIG. 5 is a cross-sectional view illustrating the second clamp unit 17B of the embodiment. The first clamp unit 17A and the second clamp unit 17B have equivalent structures. Hereinafter, the second clamp unit 17B will be mainly described, and description of the first clamp unit 17A will be simplified or omitted.

The second clamp unit 17B includes a base part 171, an arm 173, a lock lever 174, and a spring 175.

The base part 171 is to be disposed on a part of the circumference of the fixing part 19. The base part 171 includes an arcuate part 171A, a protrusion 171B protruding upward from the arcuate part 171A, and a slide part 171C disposed in a guide groove 151 provided in the holder body 15. In addition, the base part 171 has: a hole 171D formed to penetrate the protrusion 171B; and a housing part 171E in which at least a part of the lock lever 174 and the spring 175 are housed. The housing part 171E is connected to the external space via the opening 171F. A screw 177 is disposed in the hole 171D via a bush 176. With the screw 177 coupled to a screw hole provided in the holder body 15, the second clamp unit 17B is fixed to the holder body 15.

The arm 173 is turnably connected to one end (first end) of the base part 171 via a turning part 172. The arm 173 has a substantially arc shape.

The lock lever 174 is movably supported by the other end (second end) of the base part 171. The lock lever 174 can lock the arm 173. The lock lever 174 includes an operation part 174A disposed on an outer side with respect to the outer curved surface of the arcuate part 171A, a moving portion 174B disposed inside the housing part 171E, a protrusion 174C inserted into a lower end of the spring 175, and a pin 174D provided to the moving portion 174B. The lock lever 174 is movable between a lock position Pa at which the arm 173 is locked and a release position Pb at which the arm 173 is unlocked. The movement range of the lock lever 174 is defined by an opening 171F. The lock position Pa is defined below the release position Pb. A position where at least a part of the lock lever 174 abuts against the lower end of the opening 171F is the lock position Pa. A position where at least a part of the lock lever 174 abuts against the upper end of the opening 171F is the release position Pb. As illustrated in FIG. 5, in a state where the lock lever 174 is disposed at the lock position Pa, a recess 173A provided in a distal end of the arm 173 is hooked on the pin 174D, whereby the arm 173 is locked.

The spring 175 applies an elastic force to the lock lever 174. The spring 175 is in contact with at least a part of the lock lever 174. The spring 175 is disposed in the housing part 171E. An upper end of the spring 175 is in contact with an upper wall surface 171G of the housing part 171E of the base part 171. The lower end of the spring 175 is in contact with a support surface 174E provided in the moving portion 174B of the lock lever 174. The spring 175 is disposed between the upper wall surface 171G and the support surface 174E in a compressed state. The spring 175 applies the elastic force to the lock lever 174 in such a manner that the lock lever 174 moves toward the lock position Pa. The pin 174D presses the recess 173A by the elastic force of the spring 175.

Figure 6:
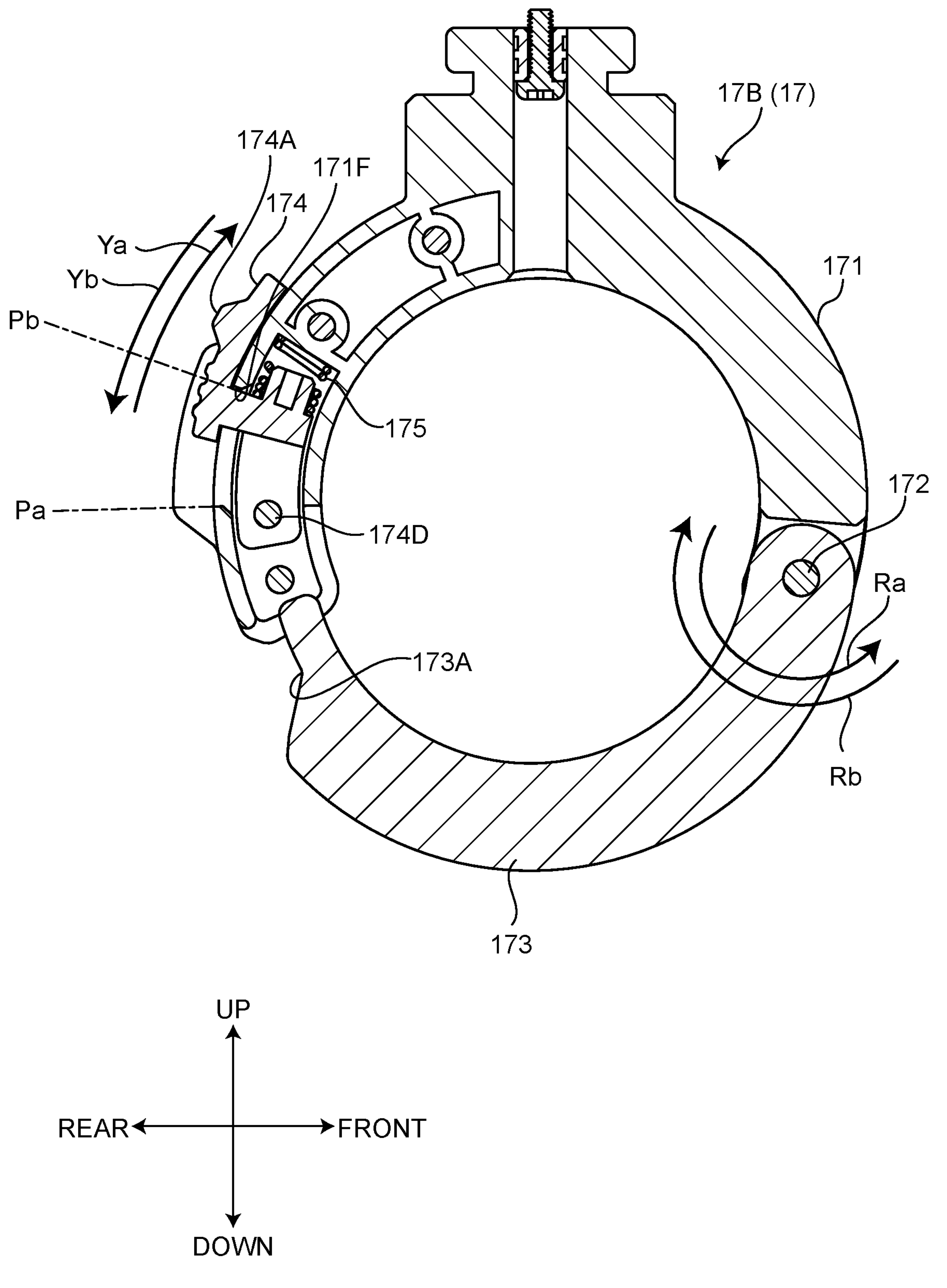
FIG. 6 is a cross-sectional view for explaining the operation of the second clamp unit of the embodiment.
Figure 7:
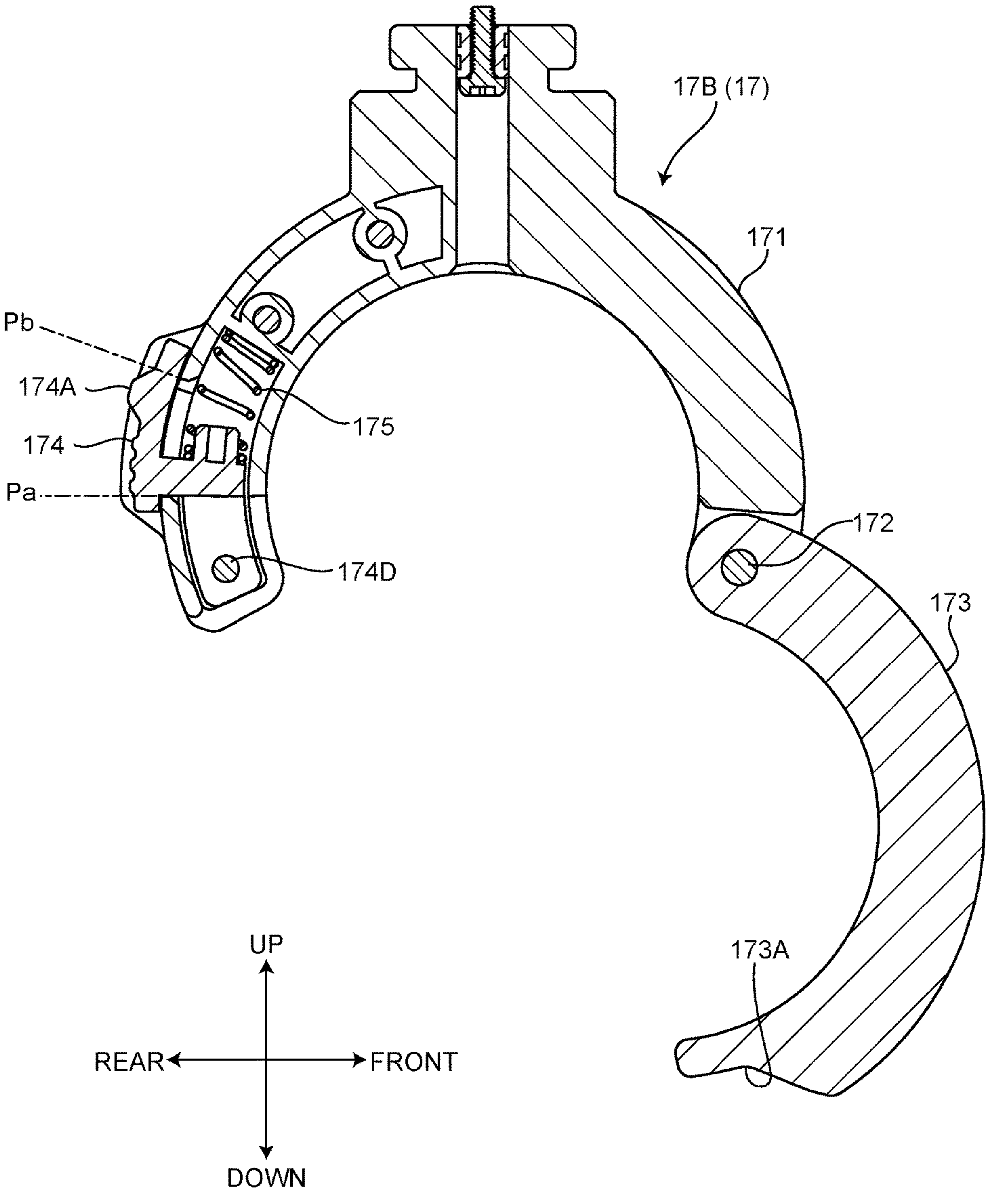
FIG. 7 is a cross-sectional view for explaining the operation of the second clamp unit of the embodiment.

Each of FIGS. 6 and 7 is a cross-sectional view for explaining the operation of the second clamp unit 17B of the embodiment.

To release the lock of the arm 173 by the lock lever 174, as illustrated in FIG. 6, the operation part 174A is operated such that the lock lever 174 moves from the lock position Pa to the release position Pb. That is, the lock lever 174 is moved in a direction indicated by an arrow Ya in FIG. 6. The user moves the lock lever 174 from the lock position Pa to the release position Pb against the elastic force of the spring 175. With the lock lever 174 moving to the release position Pb, the pin 174D is detached from the recess 173A. As a result, the lock by the lock lever 174 is released. When the lock is released, the arm 173 turns in a direction indicated by an arrow Ra. As a result, as illustrated in FIG. 7, the base part 171 and the arm 173 are separated. The user can insert the fixing part 19 into the inside of the base part 171 or remove the fixing part 19 from the inside of the base part 171. When the user releases the lock lever 174, the lock lever 174 returns to the lock position Pa due to the elastic force of the spring 175 as illustrated in FIG. 7.

In order that the second clamp unit 17B holds the fixing part 19; after disposing the fixing part 19 inside the base part 171, the user operates the arm 173 such that the arm 173 turns in the direction indicated by the arrow Rb illustrated in FIG. 6. With the arm 173 turning in the direction indicated by the arrow Rb, the pin 174D is disposed in the recess 173A. The spring 175 applies the elastic force to the lock lever 174 such that the lock lever 174 moves toward the lock position Pa. Therefore, after the pin 174D is hooked on the recess 173A, the lock lever 174 moves in the direction indicated by the arrow Yb by the elastic force of the spring 175. As a result, the pin 174D is hooked on the recess 173A, and the arm 173 is locked by the lock lever 174.

Rotation Unit

Figure 8:
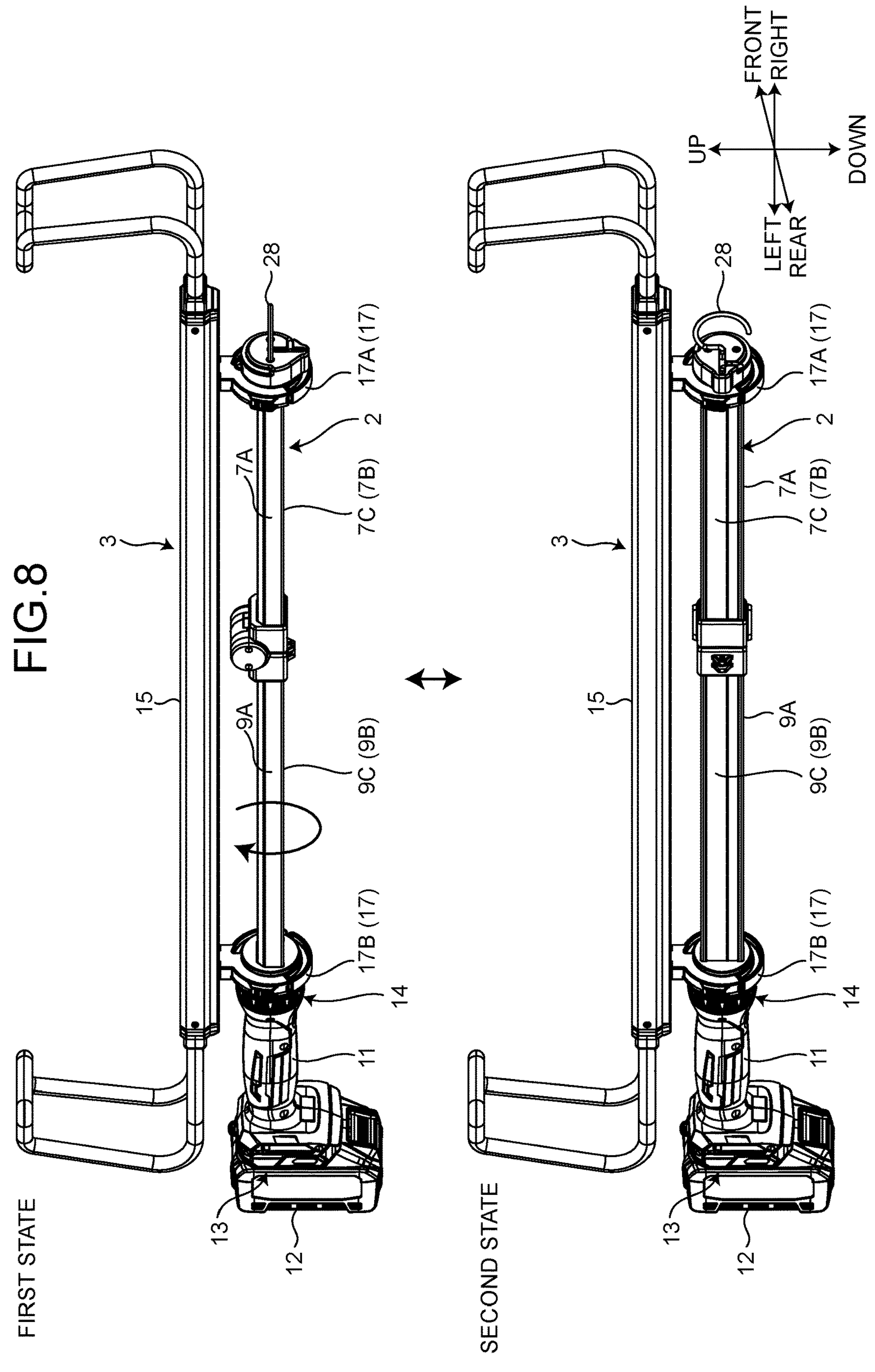
FIG. 8 is a perspective view for explaining the operation of a rotation unit of the embodiment.

FIG. 8 is a perspective view for explaining the operation of the rotation unit 14 of the embodiment. In FIG. 8, a first state is a state in which the light emitting plane 7B and the light emitting plane 9B face downward. In a state where the attitude (orientation or the like) of the holder 3 and the attitude (orientation or the like) of the battery pack 12 are maintained by the rotation unit 14; for example, it is possible to shift to a second state in which the light emitting plane 7B and the light emitting plane 9B face rearward. In a case where the rotation unit 14 is not included, for example, when the light 2 is rotated such that the light emitting plane 7B and the light emitting plane 9B face rearward, the battery pack 12 also rotates. The weight of the battery pack 12 is heavy. Therefore, even when the light 2 is rotated such that the light emitting plane 7B and the light emitting plane 9B face rearward, there may be a possibility that the entire light 2 rotates such that the light emitting plane 7B and the light emitting plane 9B face, for example, downward due to the gravity (action of gravity) on the battery pack 12. In the embodiment, in a state where the attitude of the battery pack 12 is maintained by the rotation unit 14, the user can rotate a part of the light 2 to shift from, for example, the first state in which the light emitting plane 7B and the light emitting plane 9B face downward to the second state in which the light emitting plane 7B and the light emitting plane 9B face rearward. The light emitting plane 7B and the light emitting plane 9B can face any direction without being affected by the weight of the battery pack 12.

Figure 9:
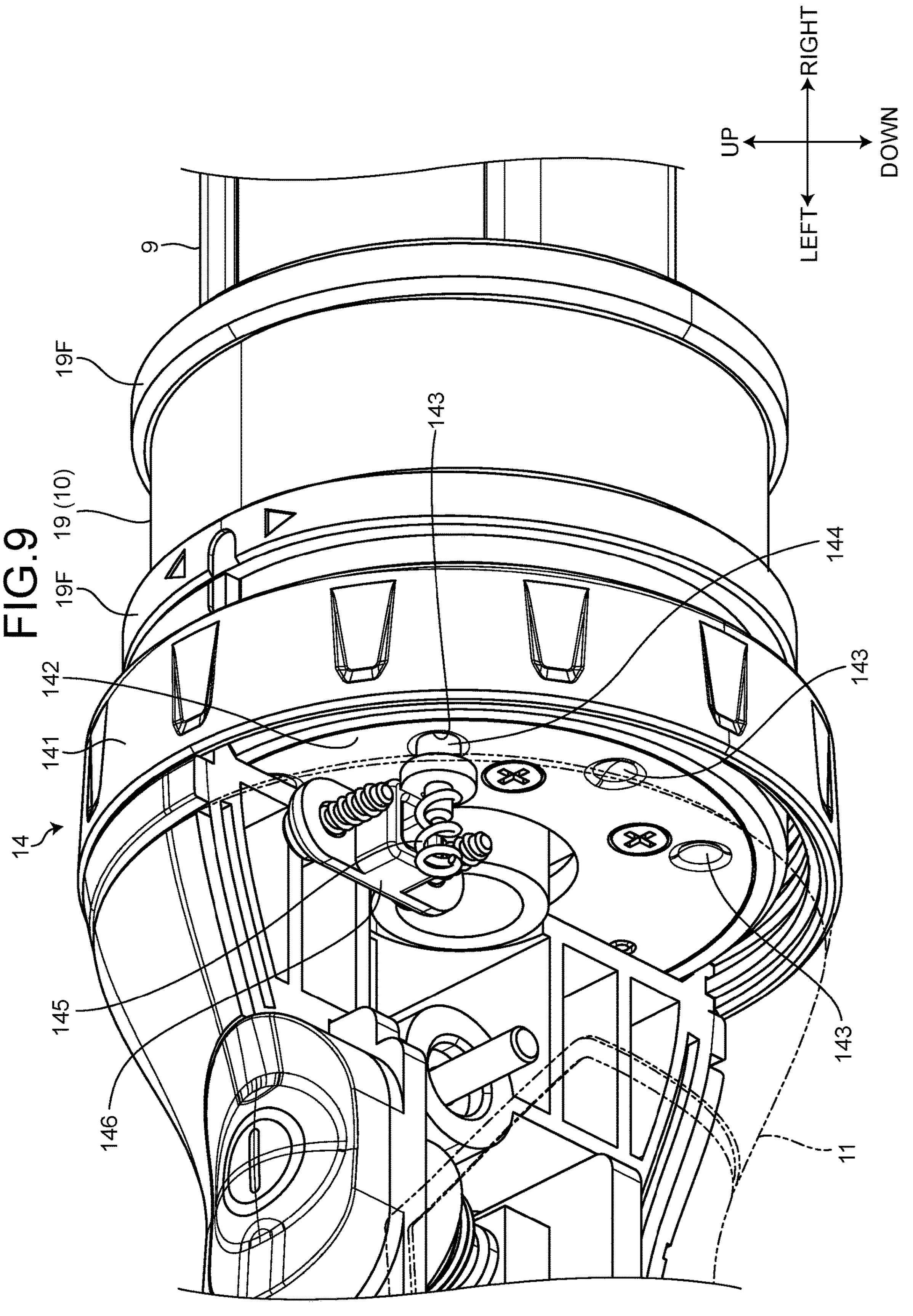
FIG. 9 is a perspective view illustrating the rotation unit of the embodiment.

FIG. 9 is a perspective view illustrating the rotation unit 14 of the embodiment. The rotation unit 14 connects the illumination part 7 and the illumination part 9 to the handle unit 11 provided with the battery mounting part 13 in a relatively rotatable manner about a rotation axis CX parallel to a left-right axis. The rotation unit 14 includes a fixing ring 141 that rotatably supports the fixing part 19, a rotation plate 142 that rotates together with the fixing part 19, a lock pin 144 that is inserted in a hole 143 included in the rotation plate 142, and a spring 145 that applies an elastic force to the lock pin 144 such that the lock pin 144 is inserted into the hole 143. The lock pin 144 and the spring 145 are disposed in an internal space of the handle unit 11. The lock pin 144 and the spring 145 are supported by the handle unit 11 via a support member 146. A plurality of the holes 143 is provided around the rotation axis CX. The holes 143 are provided, for example, at intervals of 45 degrees-apart around the rotation axis CX. The user can rotate the rotation plate 142 via the fixing part 19 against the restriction force of the lock pin 144 and the elastic force of the spring 145. When the lock pin 144 and any one of the holes 143 coincide in position with each other while the rotation plate 142 is rotated, the lock pin 144 is inserted into that hole 143. Insertion of the lock pin 144 into the hole 143 prevents rotation of the rotation plate 142. That is, by inserting the lock pin 144 into the hole 143, the rotation plate 142 is positioned in the rotation direction. The user can rotate the rotation plate 142 such that the handle unit 11 provided with the battery mounting part 13 forms any angle with respect to the illumination part 7 and the illumination part 9.

Extendable Unit

Figure 10:
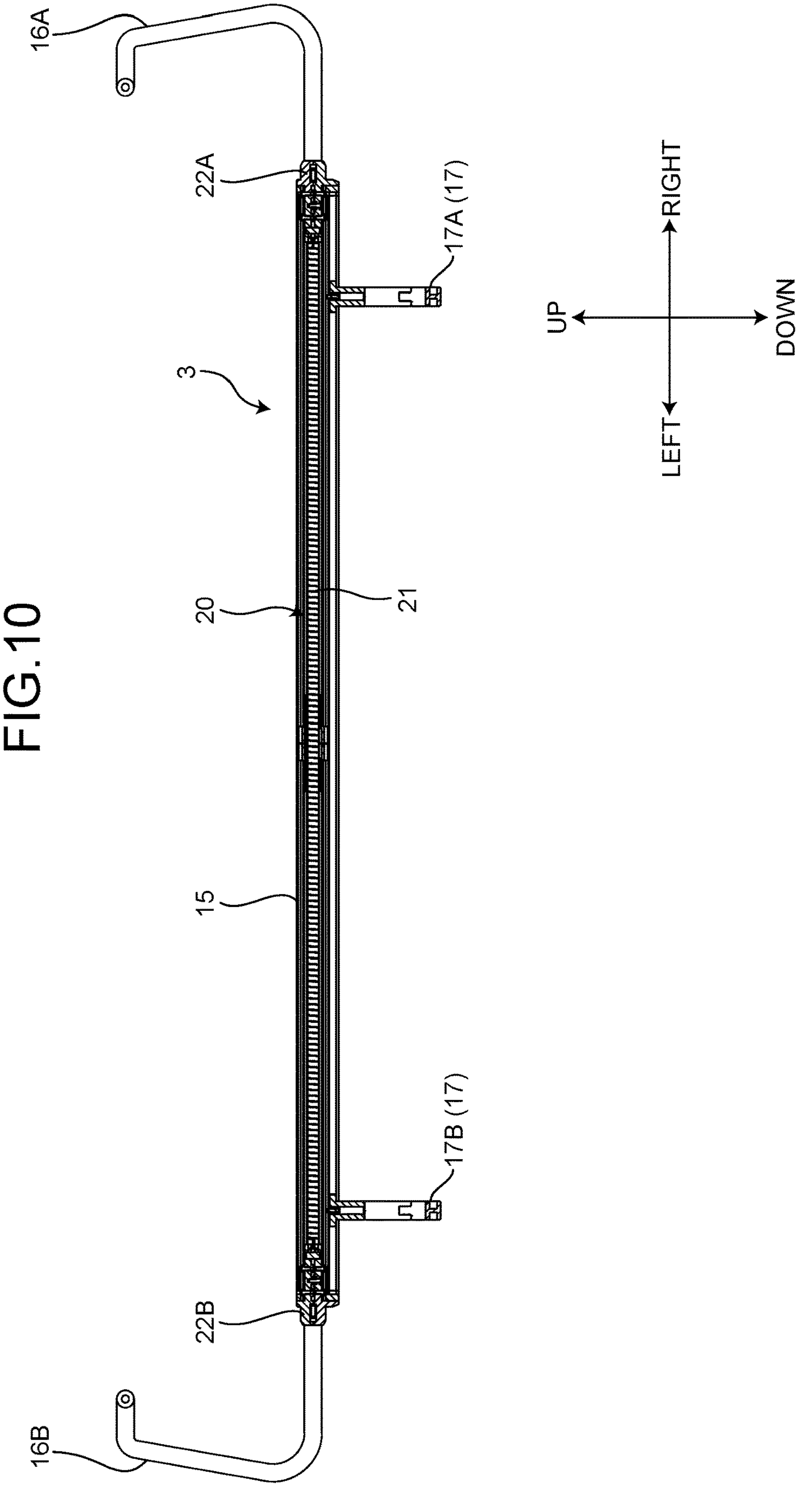
FIG. 10 is a cross-sectional view illustrating a holder of the embodiment.

FIG. 10 is a cross-sectional view illustrating the holder 3 of the embodiment. The holder 3 includes an extendable unit 20 that connects the first attachment part 16A and the second attachment part 16B in a relatively movable manner. The relative distance between the first attachment part 16A and the second attachment part 16B is changed by the extendable unit 20. The extendable unit 20 is disposed inside the holder body 15 and includes a spring 21 that connects the first attachment part 16A and the second attachment part 16B. One end (right end) of the spring 21 is connected to the first attachment part 16A via a coupling member 22A. The other end (left end) of the spring 21 is connected to the second attachment part 16B via a coupling member 22B. The spring 21 generates an elastic force such that the first attachment part 16A and the second attachment part 16B approach each other. In a case of mounting the holder 3 to a subject S having a wide width, a user separates the first attachment part 16A and the second attachment part 16B from each other against the elastic force of the spring 21 and then hooks the first attachment part 16A on a right end of the subject S and the second attachment part 16B on a left end of the subject S. As a result, the subject S is clamped between the first attachment part 16A and the second attachment part 16B, and the holder 3 is attached to the subject S.

Bent Unit

Figure 11:
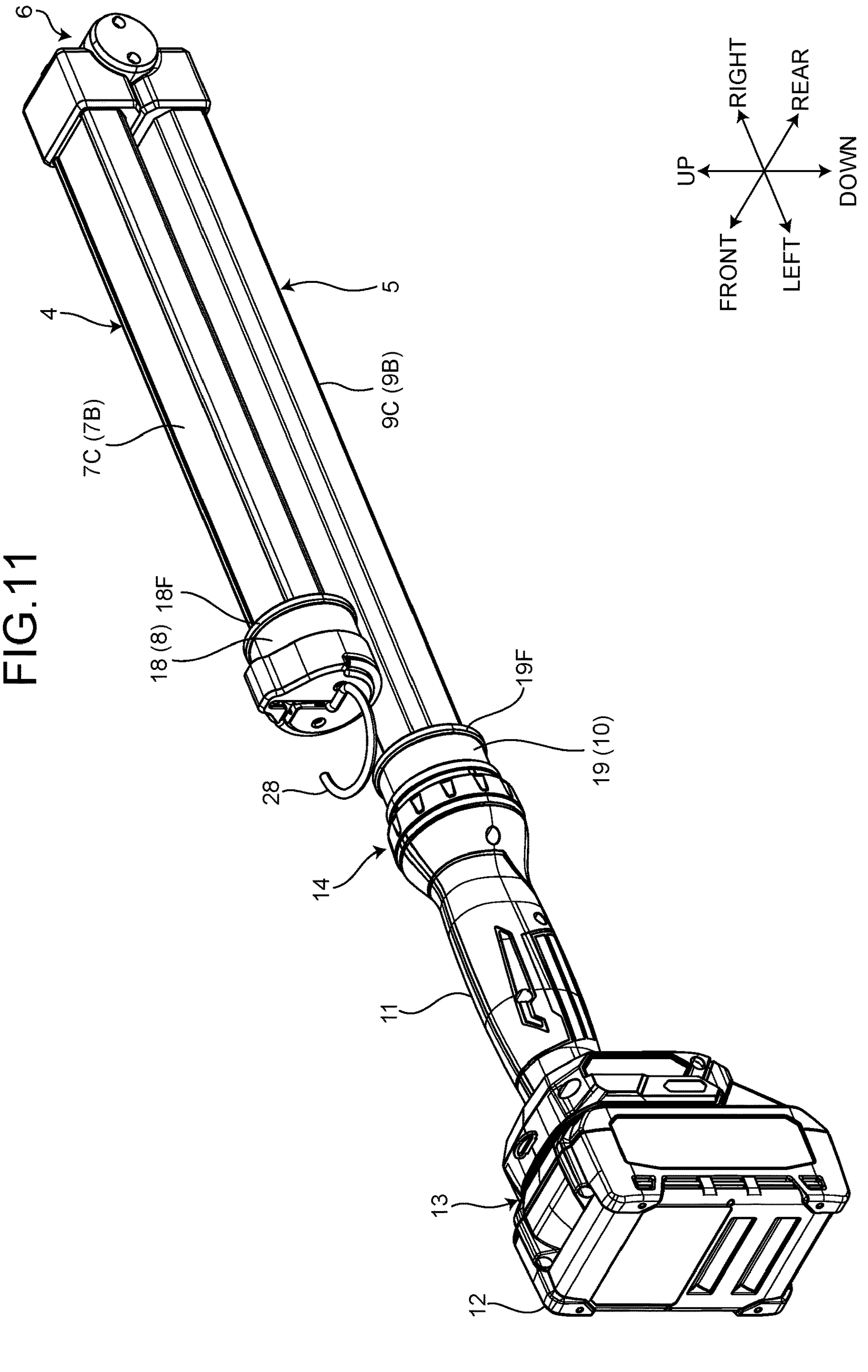
FIG. 11 is a perspective view for explaining the operation of a bent unit of the embodiment.

FIG. 11 is a perspective view for explaining the operation of the bent unit 6 of the embodiment. As illustrated in FIG. 11, the bent unit 6 relatively turns the first light unit 4 and the second light unit 5. The bent unit 6 turns the first light unit 4 and the second light unit 5 in such a manner that the light emitting plane 7B of the first light unit 4 and the light emitting plane 9B of the second light unit 5 do not face each other.

Figure 12:
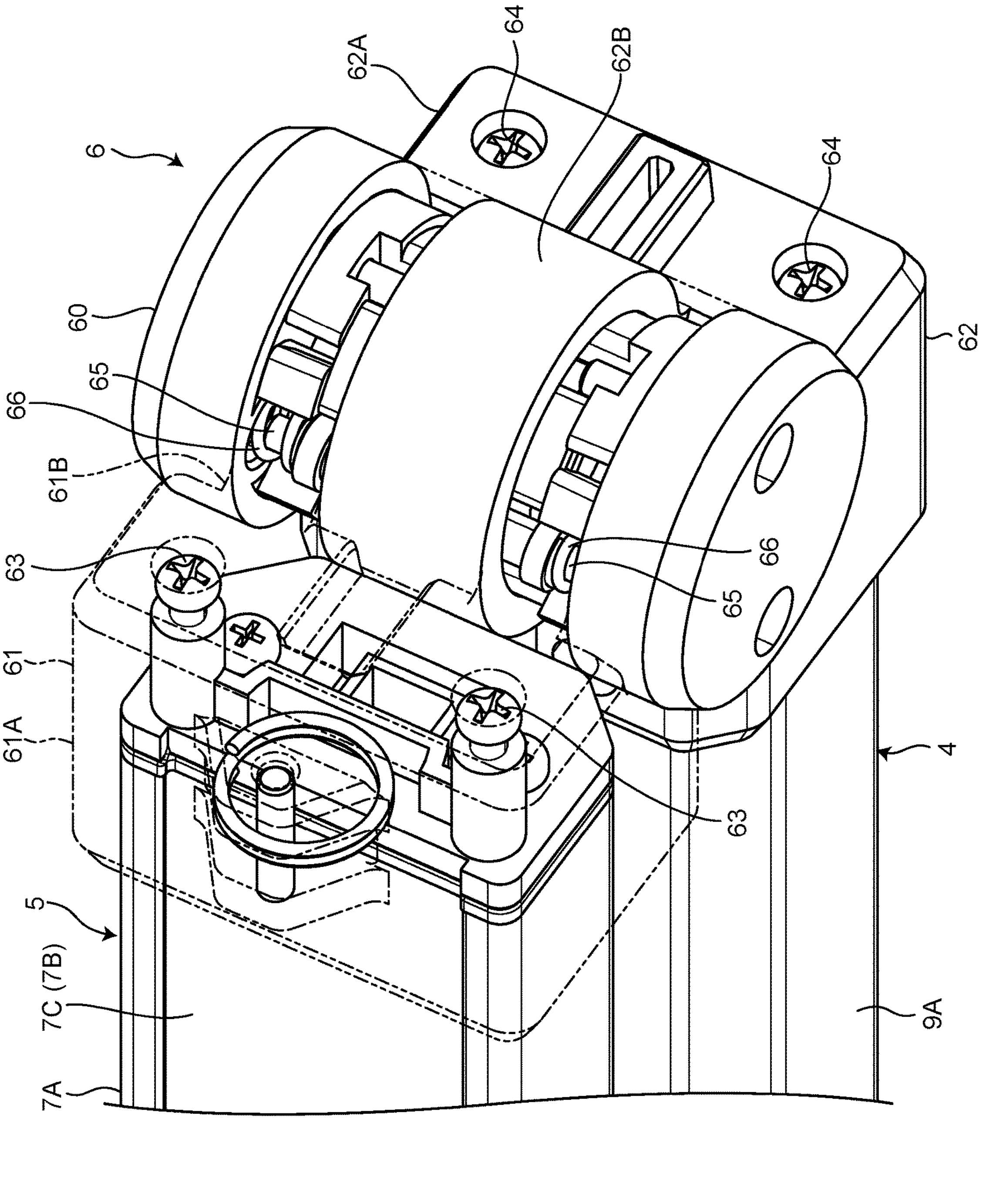
FIG. 12 is a perspective view illustrating the bent unit of the embodiment.

FIG. 12 is a perspective view illustrating the bent unit 6 of the embodiment. The bent unit 6 includes: a first fixing part 61 fixed to the second light unit 5; and a second fixing part 62 fixed to the first light unit 4. The first fixing part 61 includes: a cap part 61A to be mounted to the second light unit 5 and fixed to the second light unit 5 by screws 63; and a turning part 61B. The second fixing part 62 includes a cap part 62A to be mounted to the first light unit 4 and fixed to the first light unit 4 by screws 64 and a turning part 62B. The turning part 61B and the turning part 62B are supported by a hinge unit 60. The hinge unit 60 includes: a lock pin 65 that locks the turning part 62B via the turning part 61B; and a spring 66 that applies an elastic force to the lock pin 65 in such a manner that the lock pin 65 is pressed against the turning part 62B.

For example, a user can turn the first light unit 4 with respect to the second light unit 5 against the regulating force of the lock pin 65 and the elastic force of the spring 66. When the lock pin 65 and a positioning hole (not illustrated) included in the turning part 62B coincide with each other while the first light unit 4 is turned, the lock pin 65 is inserted into the positioning hole. With the lock pin 65 inserted in the positioning hole, the first light unit 4 is positioned in the turning direction. The user can relatively rotate the first light unit 4 and the second light unit 5 so that the first light unit 4 and the second light unit 5 are put in a state (straight state) in which the first light unit 4 and the second light unit 5 extend straight or a state (bending state) in which the first light unit 4 and the second light unit 5 are turned.

Figure 13:
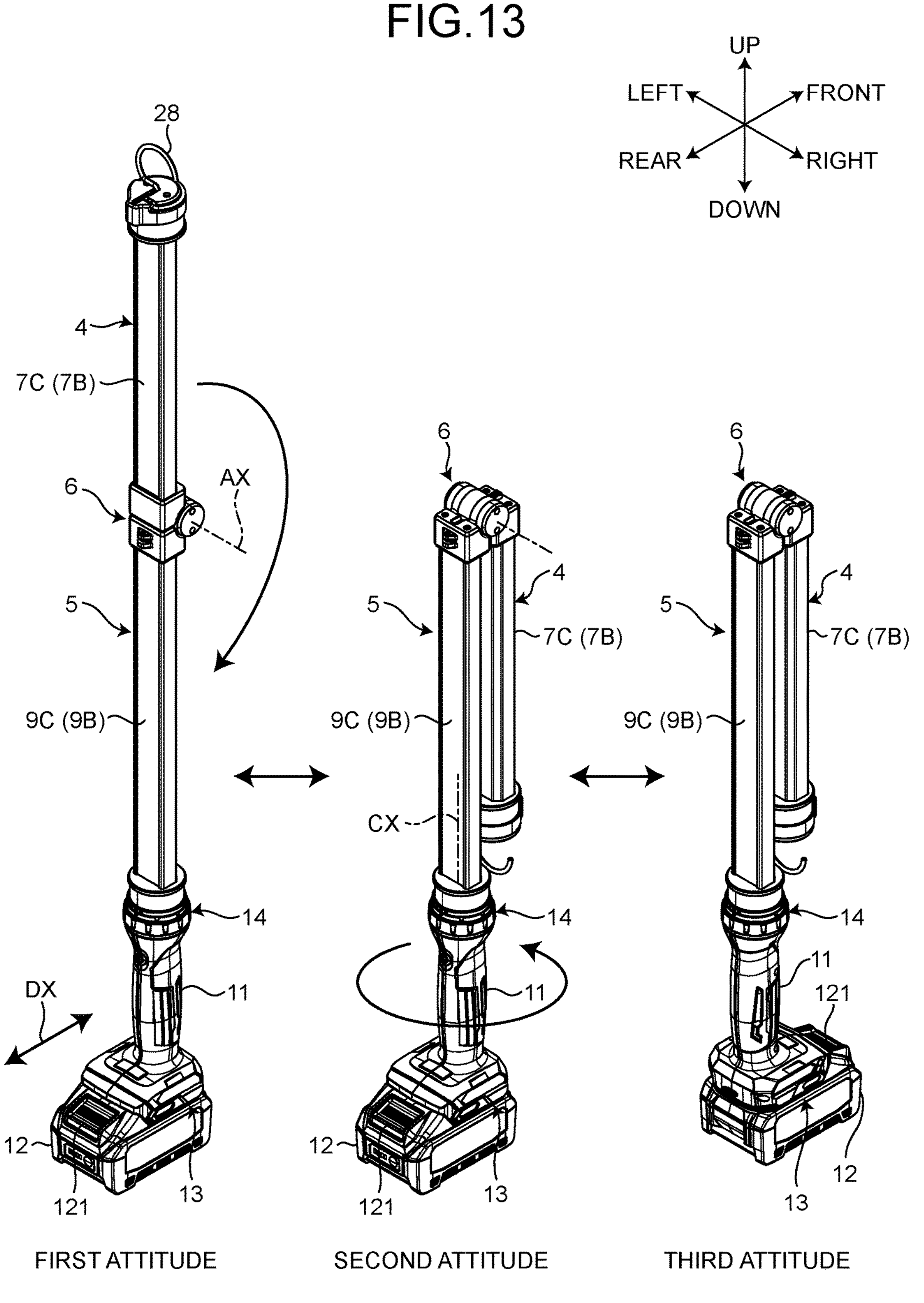
FIG. 13 is a diagram for explaining a relationship among a turning axis of the bent unit, a rotation axis of the rotation unit, and an attachment/detachment axis of a battery pack according to the embodiment.

Relationship Among Turning Axis of Bent Unit, Rotation Axis of Rotation Unit, and Attachment/Detachment Axis of Battery Pack FIG. 13 is a diagram for explaining the relationship between the turning axis AX of the bent unit 6, the rotation axis CX of the rotation unit 14, and the attachment/detachment axis DX of the battery pack 12 of the embodiment. The battery pack 12 is attached to and detached from the battery mounting part 13 by being moved in a direction parallel to a predetermined attachment/detachment axis DX with respect to the battery mounting part 13. In the example illustrated in FIG. 13, the attachment/detachment axis DX is parallel to the front-rear direction. The turning axis AX of the bent unit 6 is parallel to the left-right direction. The rotation axis CX of the rotation unit 14 is parallel to the vertical direction. The turning axis AX of the bent unit 6 and the attachment/detachment axis DX of the battery pack 12 are orthogonal to each other. The rotation axis CX of the rotation unit 14 and the attachment/detachment axis DX of the battery pack 12 are orthogonal to each other. As described above, in the embodiment, the turning axis AX, the rotation axis CX, and the attachment/detachment axis DX are orthogonal to each other.

As illustrated in FIG. 13, the user can use the light 2 in a first attitude in which the first light unit 4 and the second light unit 5 extend straight in the vertical direction and the battery pack 12 is installed on an installation plane parallel to a horizontal plane. The user can use the light 2 in a second attitude in which the first light unit 4 and the second light unit 5 are turned and the battery pack 12 is installed on the installation plane parallel to a horizontal plane in such a manner that an unlock button 121 of the battery pack 12 faces rearward. The user can use the light 2 in a third attitude in which the first light unit 4 and the second light unit 5 are turned and the battery pack 12 is installed on the installation plane parallel to a horizontal plane in such a manner that the unlock button 121 of the battery pack 12 faces forward. For example, in a case where the light 2 is likely to fall in the second attitude, the user can use the light 2 in the third attitude. In addition, the user can adopt any attitude among the first attitude, the second attitude, and the third attitude, for example, depending on a use situation of the light 2.

Strap Hook

Figure 14:
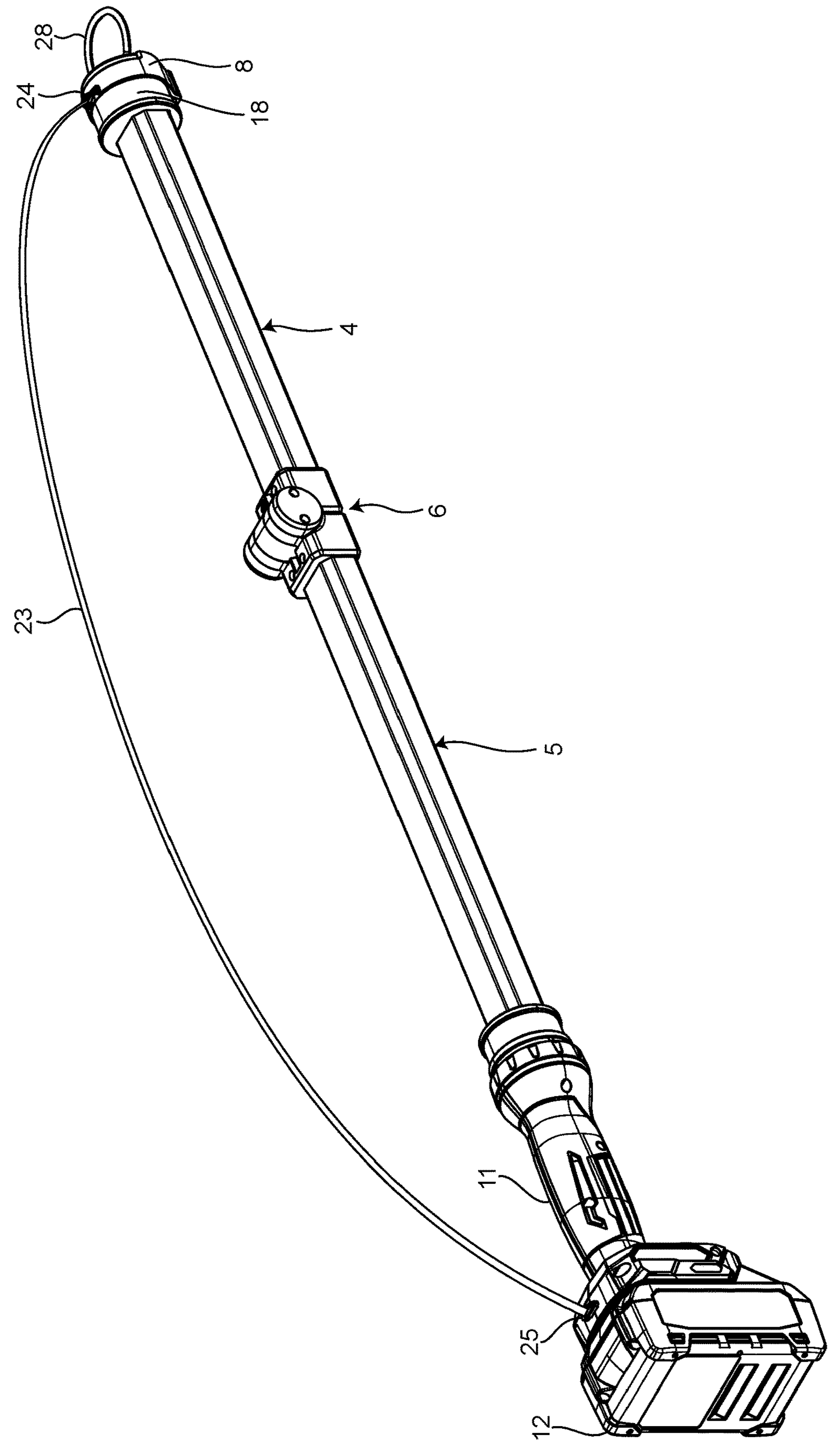
FIG. 14 is a diagram illustrating a state in which a strap is attached to a light of the embodiment.
Figure 15:
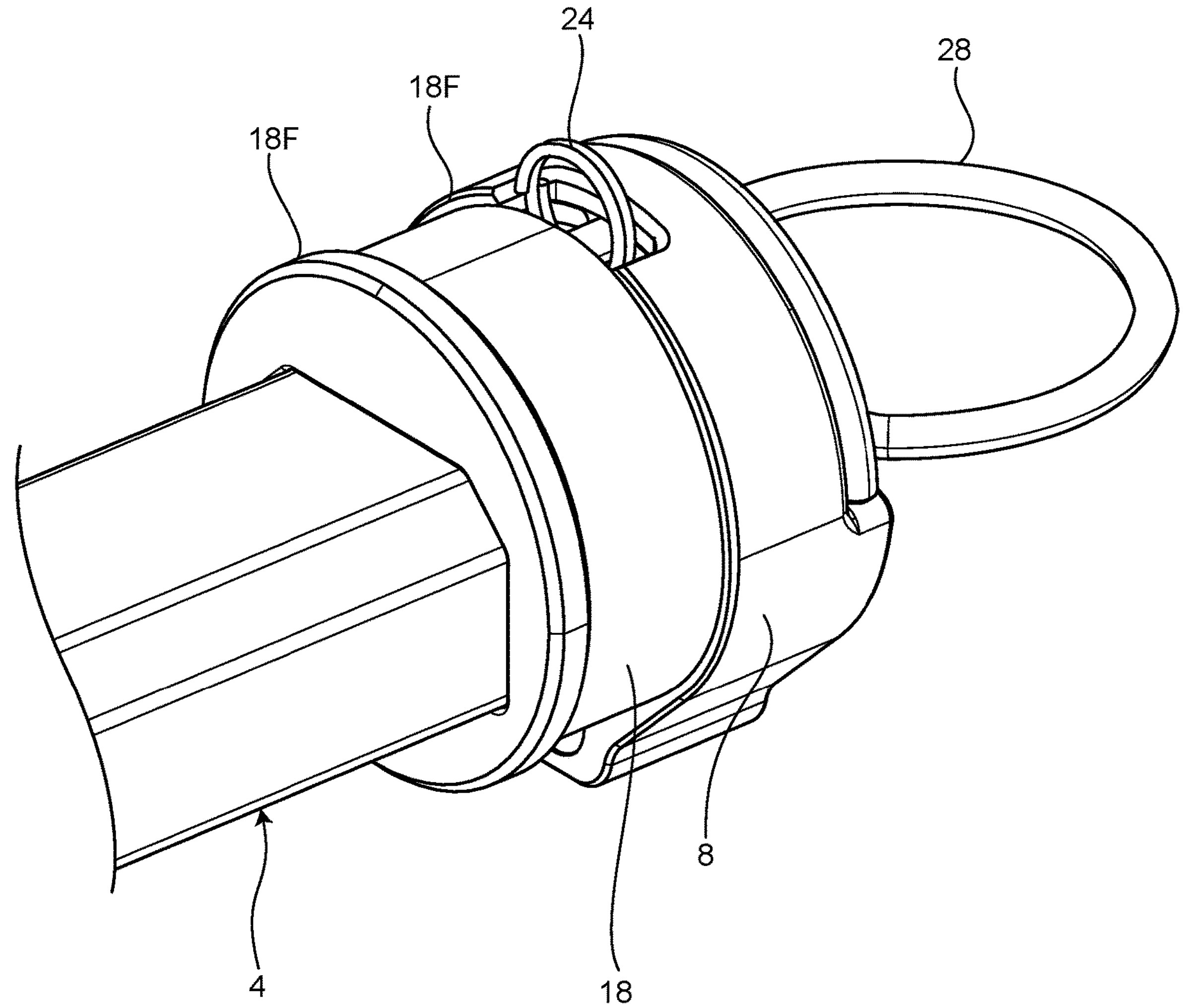
FIG. 15 is a diagram illustrating a strap hook provided in a non-illumination part of a first light unit of the embodiment.
Figure 16:
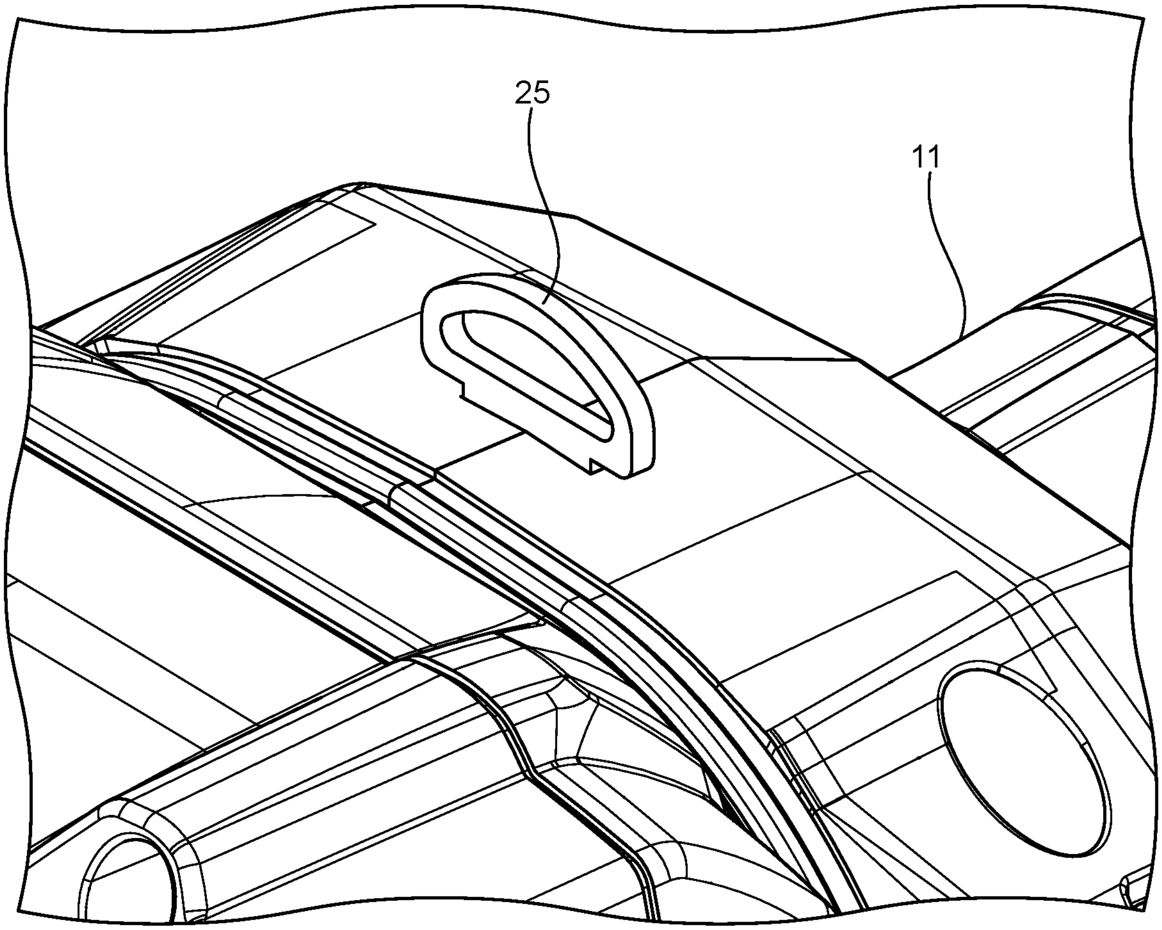
FIG. 16 is a diagram illustrating a strap hook provided to a handle unit of the embodiment.

FIG. 14 is a diagram illustrating a state in which a strap 23 is attached to the light 2 of the embodiment. FIG. 15 is a diagram illustrating a strap hook 24 provided to the non-illumination part 8 of the first light unit 4 of the embodiment. FIG. 16 is a diagram illustrating a strap hook 25 provided to the handle unit 11 of the embodiment.

As illustrated in FIGS. 14, 15, and 16, the strap hook 24 is provided to the non-illumination part 8 of the first light unit 4 including the fixing part 18, and the strap hook 25 is provided to the handle unit 11. One end of the strap 23 is hooked on the strap hook 24, and the other end of the strap 23 is hooked on the strap hook 25. The user can carry and transport the light 2 via the strap 23 with the first light unit 4 and the second light unit 5 extending straight.

Figure 17:
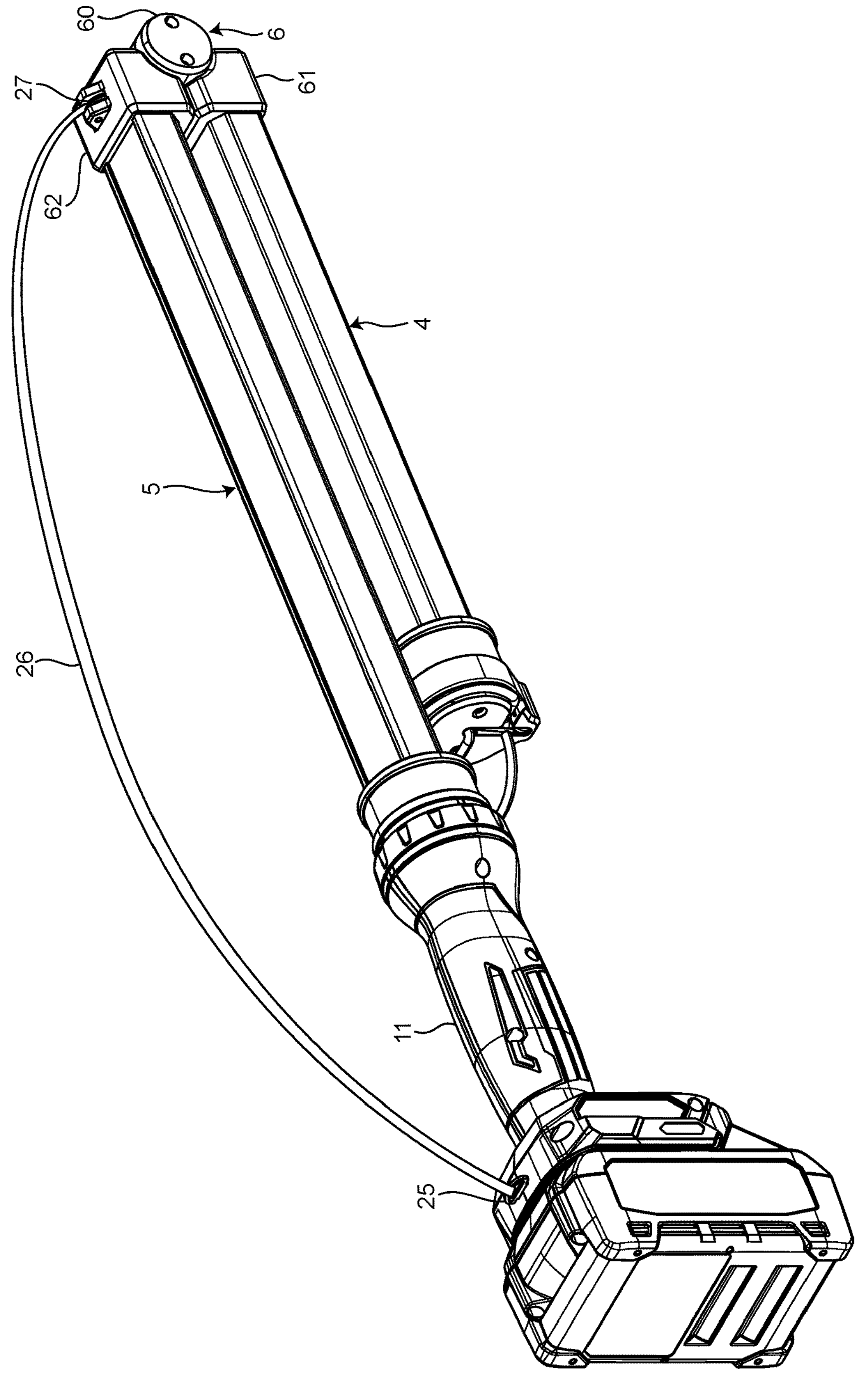
FIG. 17 is a diagram illustrating a state in which a strap is attached to the light of the embodiment.
Figure 18:
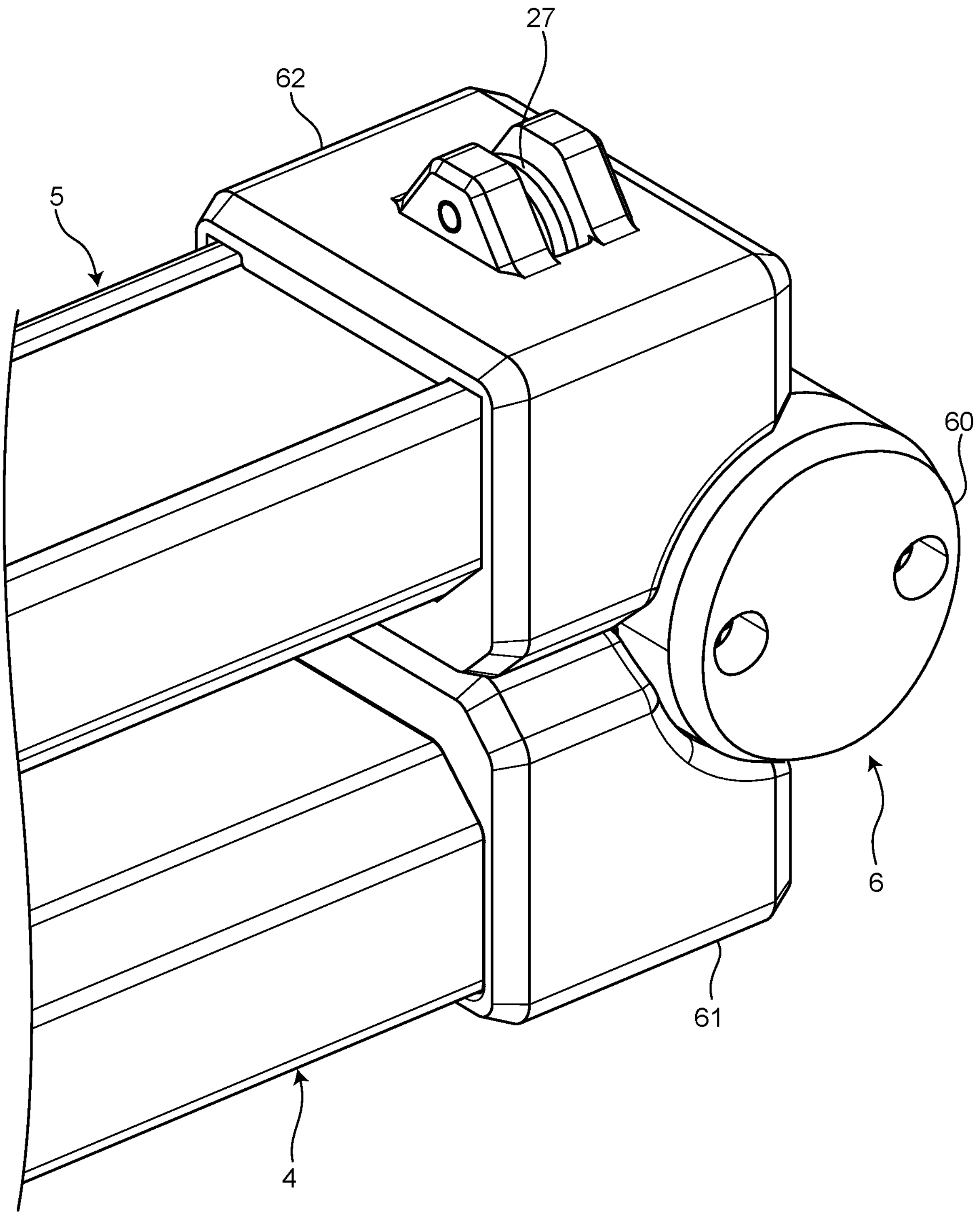
FIG. 18 is a diagram illustrating a strap hook provided to the bent unit of the embodiment.

FIG. 17 is a diagram illustrating a state in which a strap 26 is attached to the light 2 of the embodiment. FIG. 18 is a diagram illustrating a strap hook 27 provided to the bent unit 6 of the embodiment.

As illustrated in FIGS. 16, 17, and 18, the second fixing part 62 of the bent unit 6 is provided with the strap hook 27, and the handle unit 11 is provided with the strap hook 25. One end of the strap 26 is hooked on the strap hook 27, and the other end of the strap 26 is hooked on the strap hook 25. The user can carry or transport the light 2 via the strap 26 in a state where the first light unit 4 and the second light unit 5 are turned.

Suspension Hook

Figure 19:
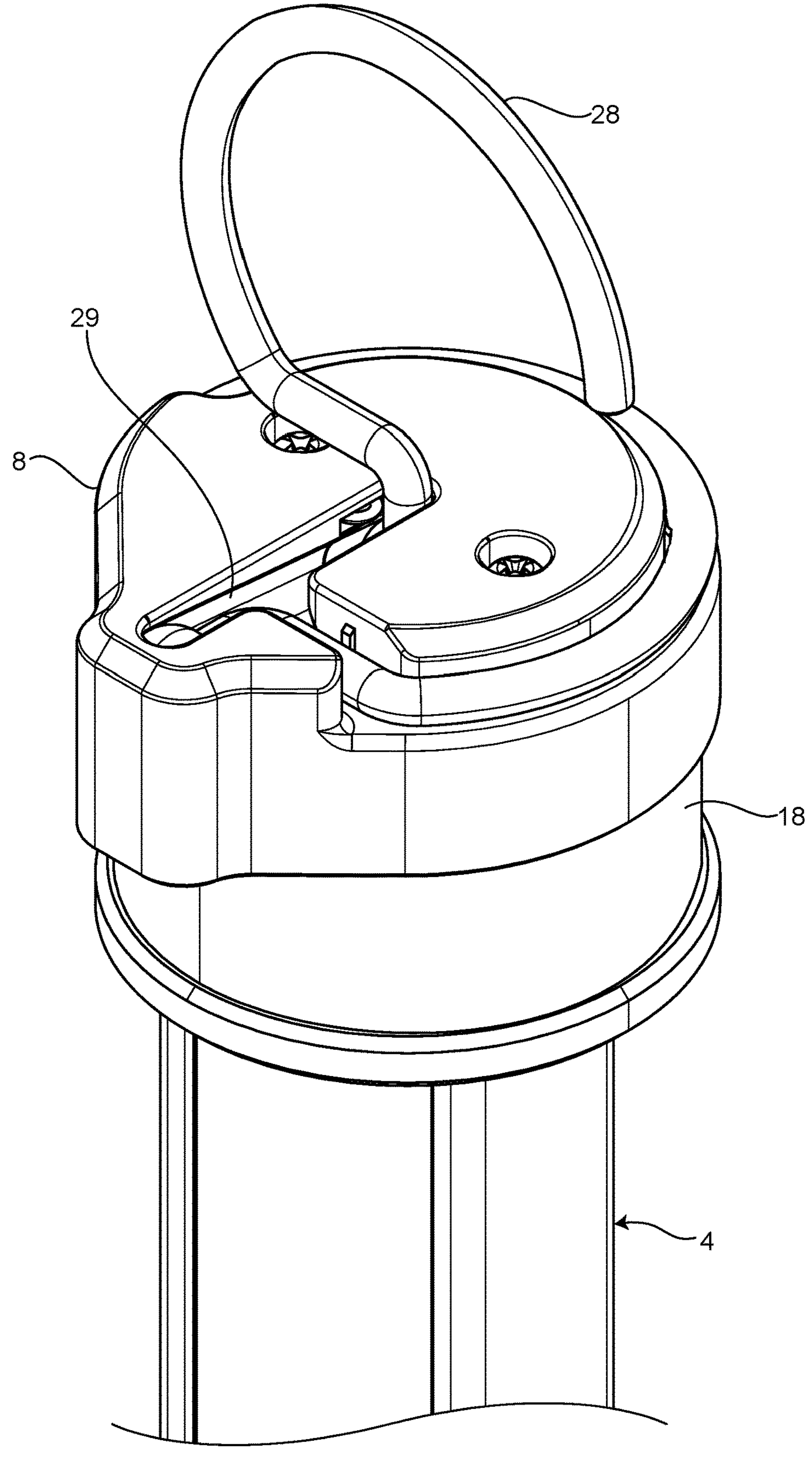
FIG. 19 is a diagram illustrating a suspension hook of the embodiment.

FIG. 19 is a diagram illustrating a suspension hook 28 of the embodiment. The suspension hook 28 is connected to the non-illumination part 8. The suspension hook 28 is turnably connected to the non-illumination part 8. A recess 29 is included in the non-illumination part 8. The suspension hook 28 is turnable so as to be stored in the recess 29.

Fixing Member

Figure 20:
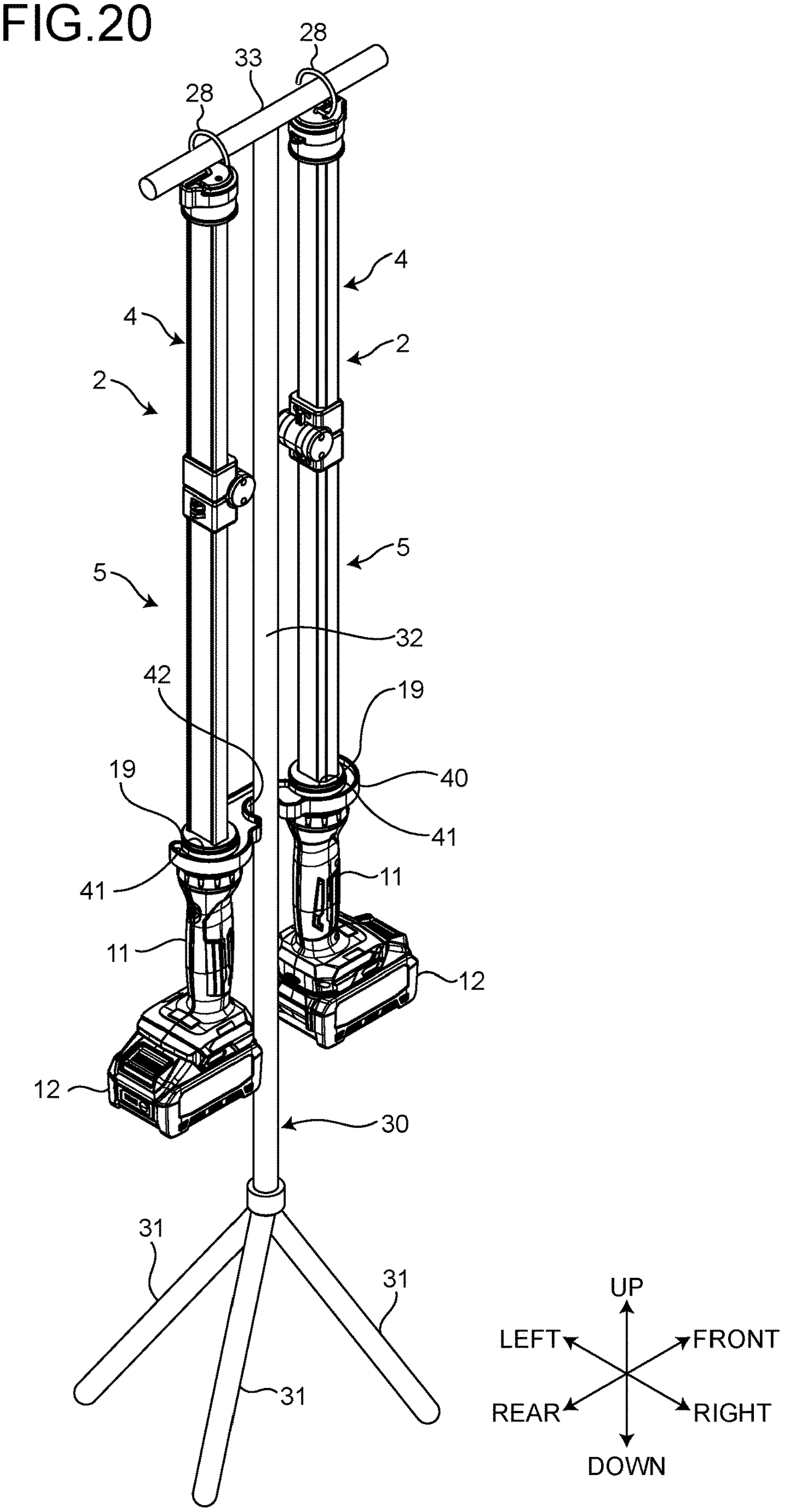
FIG. 20 is a perspective view illustrating a state in which the lights of the embodiment are hung on a tripod.

FIG. 20 is a perspective view illustrating a state in which the lights 2 of the embodiment are hung on a tripod 30. The tripod 30 includes three legs 31, a pole 32, and a bar 33. The pole 32 extends upward from an upper end of the legs 31. The bar 33 is disposed at an upper end of the pole 32. The bar 33 is disposed parallel to a horizontal plane. Suspension hooks 28 are hooked on the bar 33. The lights 2 are hung from the bar 33 of the tripod 30 via the suspension hooks 28.

In the embodiment, the illumination system 1 includes a fixing member 40 that fixes the lights 2 hung on the bar 33 of the tripod 30 and the pole 32 of the tripod 30.

Figure 21:
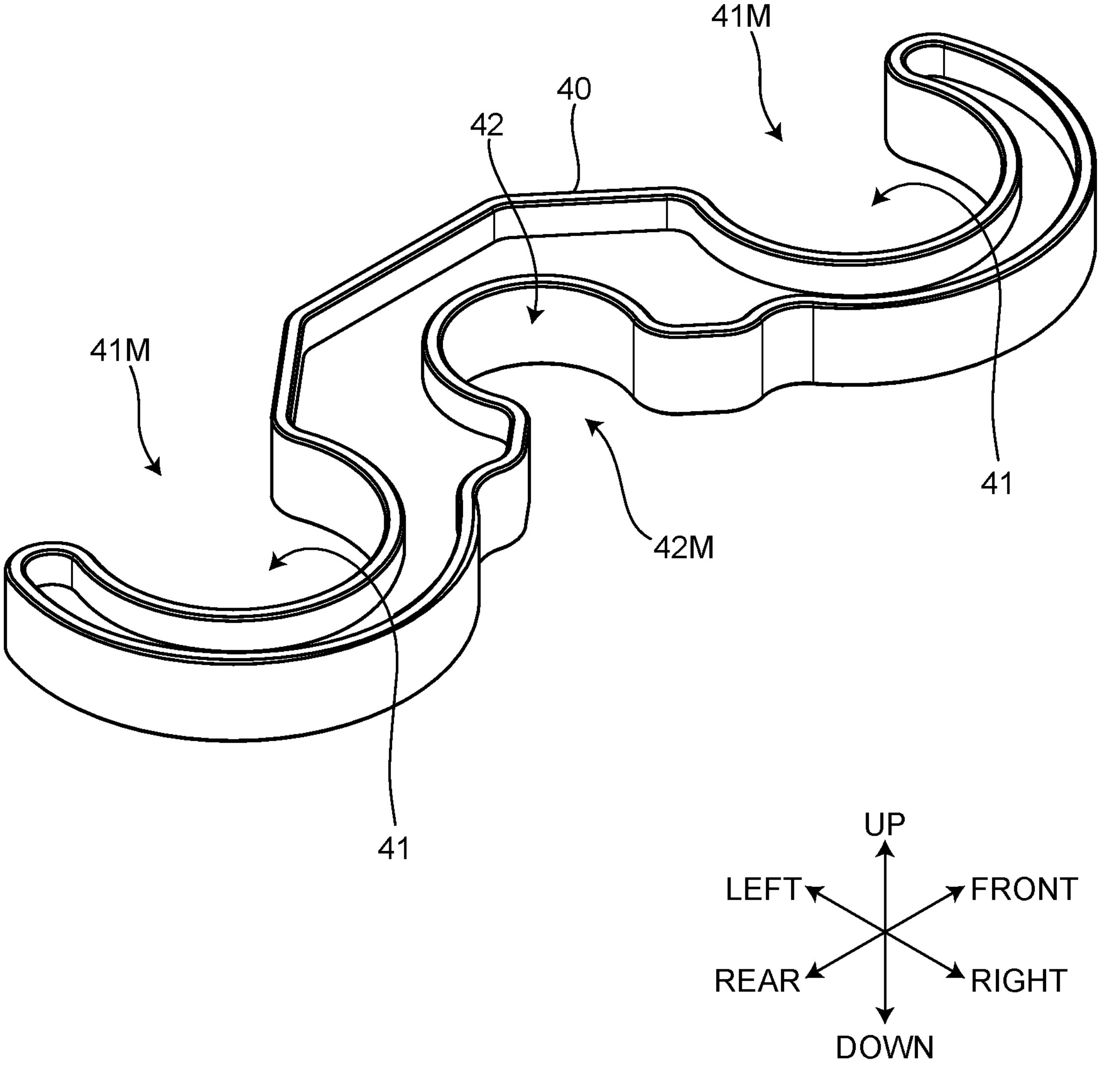
FIG. 21 is a perspective view illustrating a fixing member of the embodiment.

FIG. 21 is a perspective view illustrating the fixing member 40 of the embodiment. As illustrated in FIGS. 20 and 21, the fixing member 40 includes: light holding parts 41 that hold at least a part of each of the lights 2 hung on the bar 33 of the tripod 30; and a tripod attaching part 42 attached to at least a part of the tripod 30. In the embodiment, the light holding parts 41 hold the fixing parts 19 of the lights 2. The tripod attaching part 42 is attached to the pole 32 of the tripod 30.

The tripod attaching part 42 is disposed at a part of the circumference of the pole 32. The tripod attaching part 42 includes a recess provided in the fixing member 40. The tripod attaching part 42 includes a tripod opening 42M through which the pole 32 is inserted. The pole 32 is inserted into the tripod attaching part 42 through the tripod opening 42M. As a result that the pole 32 is fitted into the tripod attaching part 42, the tripod attaching part 42 is attached to the pole 32.

A light holding part 41 is disposed at a part of the circumference of the fixing part 19. The light holding part 41 includes a recess provided in the fixing member 40. The light holding part 41 includes a light opening 41M through which the fixing part 19 is inserted. The fixing part 19 is inserted into the light holding part 41 via the light opening 41M. As a result that the fixing part 19 is fitted into the light holding part 41, the light holding part 41 holds the fixing part 19.

The suspension hook 28 is connected to the non-illumination part 8 connected to the upper end of the illumination part 7. The light holding part 41 holds the fixing part 19 of the non-illumination part 10 connected to the lower end of the illumination part 9. Since the upper end of the light 2 is hung from the bar 33, and the lower portion of the light 2 is fixed to the pole 32 via the fixing member 40, the light 2 is prevented from swinging.

A plurality of the light holding parts 41 is included. In the embodiment, two light holding parts 41 are included. The light holding parts 41 are disposed on both sides of the tripod attaching part 42. As a result, the fixing member 40 can fix the two lights 2 and the tripod 30.

The tripod opening 42M and each of the light openings 41M face in mutually different directions. The tripod opening 42M and each of the light openings 41M face in opposite directions. In the example illustrated in FIGS. 20 and 21, the tripod opening 42M faces rightward, and the light openings 41M face leftward. This stabilizes the fixation among the lights 2 and the tripod 30 by the fixing member 40.

As described above, the light 2 has the flange parts 19F provided at both ends of the fixing part 19. A light holding part 41 holds the fixing part 19 between one of the flange parts 19F and the other flange part 19F. A part of the upper end surface and a part of the lower end surface of the fixing member 40 can be each in contact with a flange part 19F. The fixing part 19 and the fixing member 40 are positioned in the vertical direction by the flange parts 19F.

Figure 22:
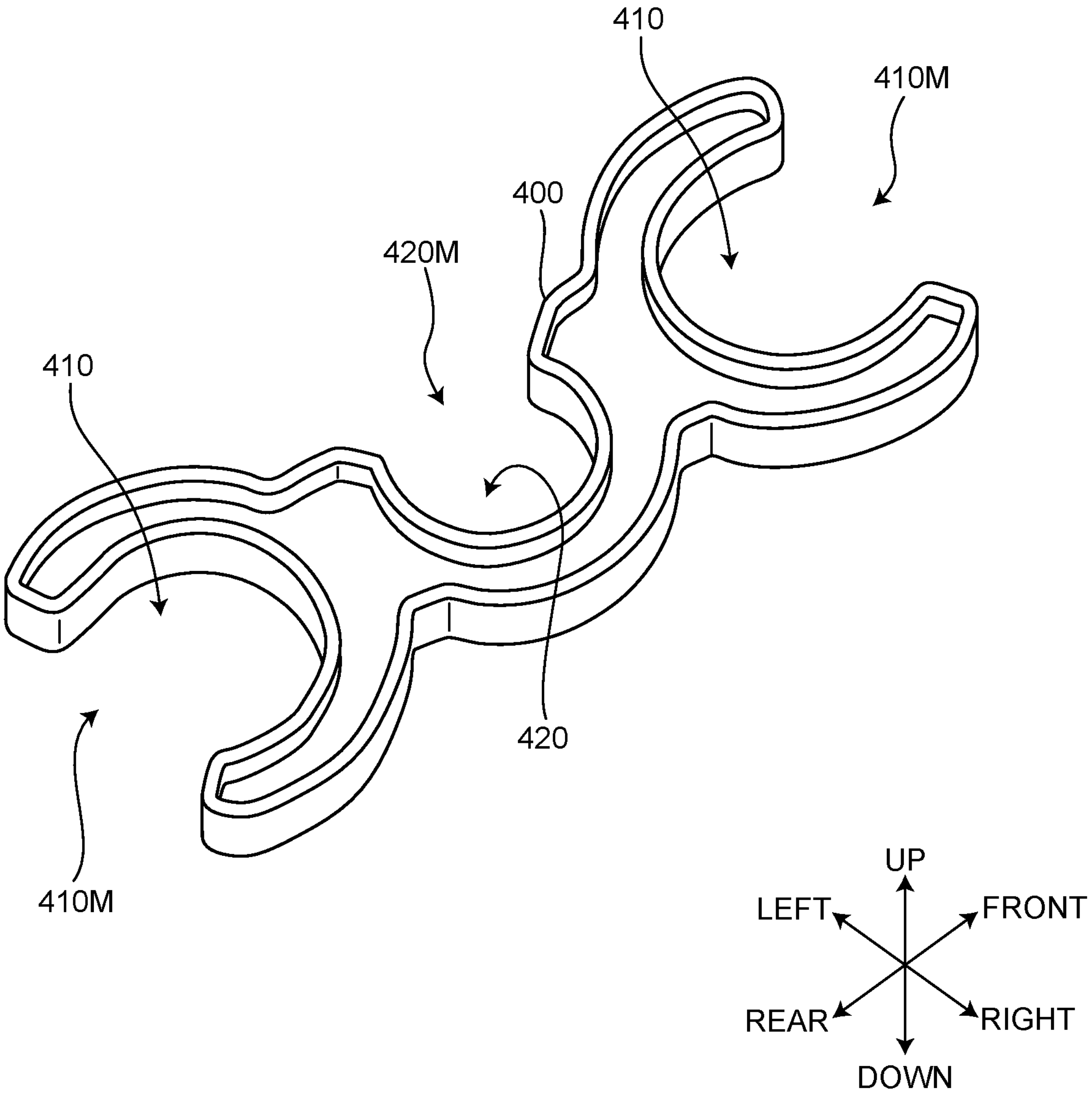
FIG. 22 is a perspective view illustrating a fixing member according to a modification of the embodiment.

FIG. 22 is a perspective view illustrating a fixing member 400 according to a modification of the embodiment. The fixing member 400 includes: light holding parts 410 that each hold a fixing part 19 of a light 2; and a tripod attaching part 420 to be attached to the pole 32 of the tripod 30.

The tripod attaching part 420 is disposed at a part of the circumference of the pole 32. The tripod attaching part 420 includes a recess provided in the fixing member 400. The tripod attaching part 420 includes a tripod opening 420M through which the pole 32 is inserted. The pole 32 is inserted into the tripod attaching part 420 via the tripod opening 420M. As a result that the pole 32 is fitted into the tripod attaching part 420, the tripod attaching part 420 is attached to the pole 32.

Two light holding parts 410 are provided. The light holding parts 410 are disposed on both sides of the tripod attaching part 420. Each of the light holding part 410 is disposed at a part of the circumference of the fixing part 19. Each of the light holding part 410 includes a recess provided in the fixing member 400. Each of the light holding part 410 includes a light opening 410M through which the fixing part 19 is inserted. The fixing part 19 is inserted into the light holding part 410 via the light opening 410M. As a result that the fixing part 19 is fitted into the light holding part 410, the light holding part 410 holds the fixing part 19.

The tripod opening 420M and the light openings 410M face in mutually different directions. In the example illustrated in FIG. 22, the tripod opening 420M faces leftward, one of the light openings 410M faces forward, and the other light opening 410M faces rearward.

Figure 23:
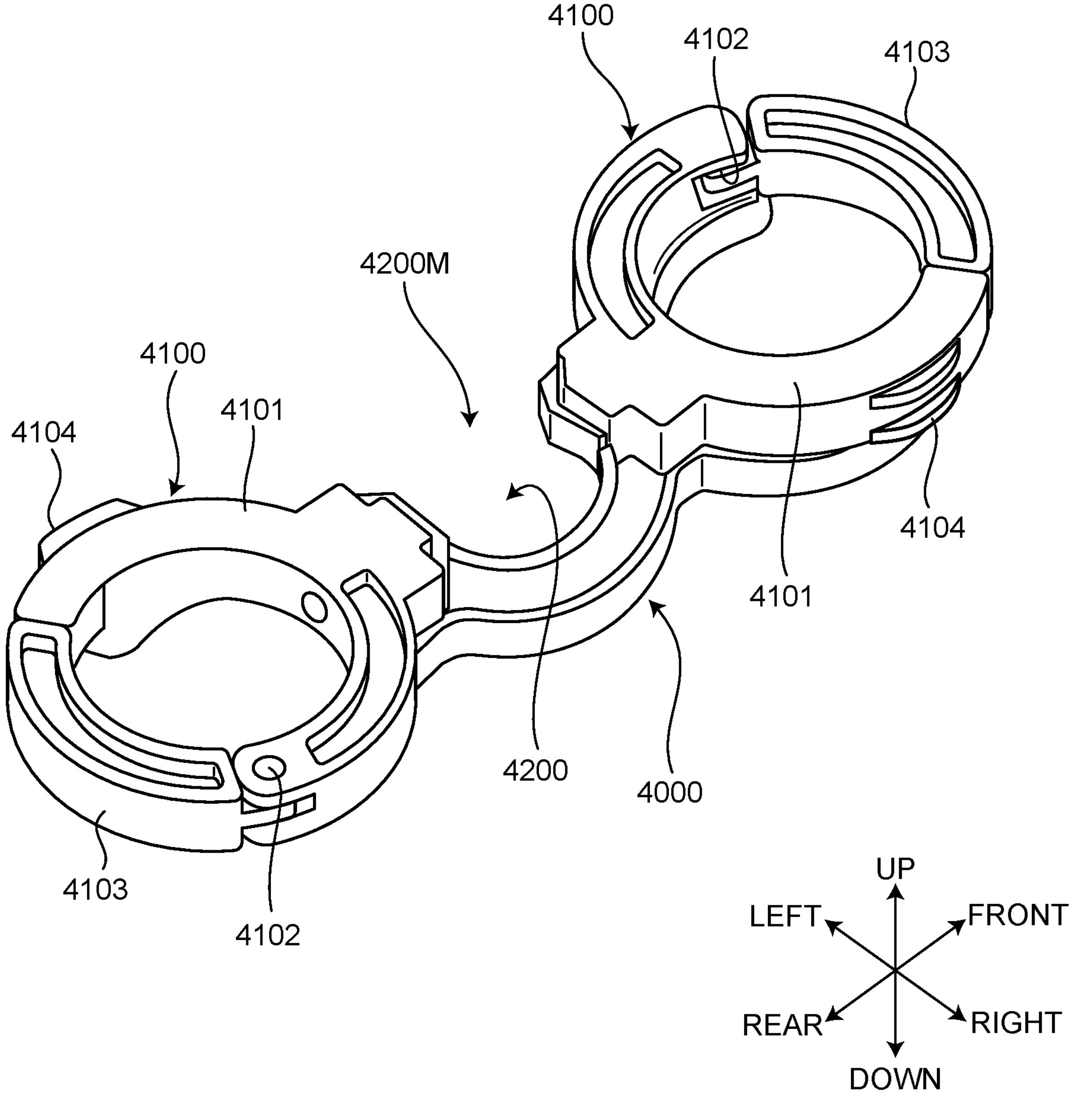
FIG. 23 is a perspective view illustrating a fixing member according to a modification of the embodiment.

FIG. 23 is a perspective view illustrating a fixing member 4000 according to a modification of the embodiment. The fixing member 4000 includes light holding parts 4100 that each hold a fixing part 19 of a light 2 and a tripod attaching part 4200 to be attached to the pole 32 of the tripod 30.

The tripod attaching part 4200 is disposed at a part of the circumference of the pole 32. The tripod attaching part 4200 includes a recess provided in the fixing member 4000. The tripod attaching part 4200 includes a tripod opening 4200M through which the pole 32 is inserted. The pole 32 is inserted into the tripod attaching part 4200 via the tripod opening 4200M. As a result that the pole 32 is fitted into the tripod attaching part 4200, the tripod attaching part 4200 is attached to the pole 32.

Two light holding parts 4100 are provided. The light holding parts 4100 are disposed on both sides of the tripod attaching part 4200. Each of the light holding parts 4100 is disposed around the fixing part 19. Each of the light holding part 4100 has an annular shape surrounding the fixing part 19.

Each of the light holding part 4100 includes a base part 4101, a turning part 4102, an arm 4103, a lock lever 4104, and a spring (not illustrated). The base part 4101 is to be disposed at a part of the circumference of the fixing part 19. The arm 4103 is turnably connected to one end of the base part 4101 via the turning part 4102. The lock lever 4104 is movably supported by the other end of the base part 4101. The lock lever 4104 can lock the arm 4103. The spring applies an elastic force to the lock lever 4104. The lock lever 4104 is movable between a lock position at which the arm 4103 is locked and a release position at which the arm 4103 is unlocked. The spring applies the elastic force to the lock lever 4104 in such a manner that the lock lever 4104 moves toward the lock position. The structure and the operation of the light holding parts 4100 of the fixing member 4000 are substantially equal to the structure and the operation of the clamp units 17 of the holder 3. Detailed description of the structure and the operation of the light holding parts 4100 will be omitted.

Figure 24:
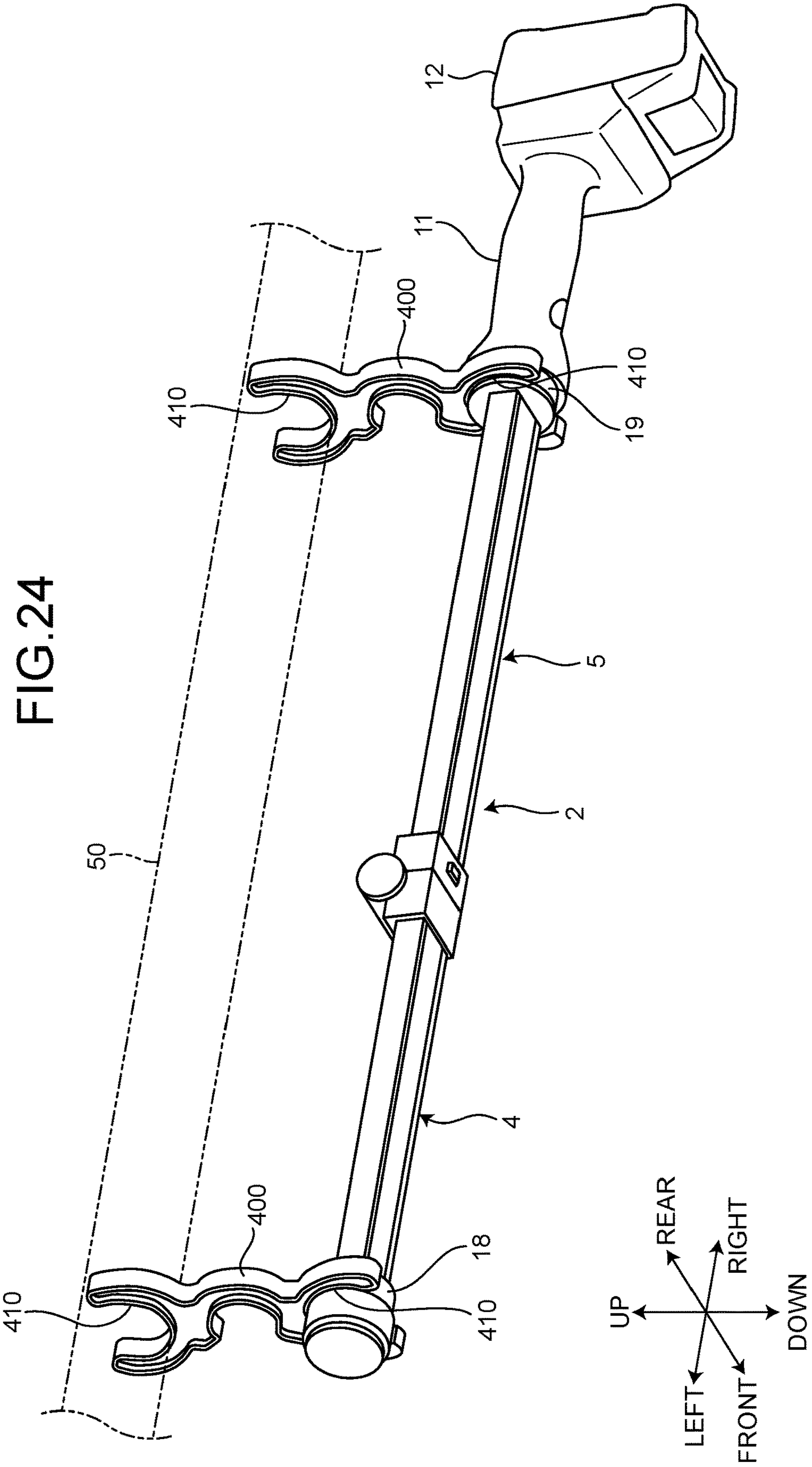
FIG. 24 is a diagram illustrating an example of a method of using the fixing member of the embodiment.

FIG. 24 is a diagram illustrating an example of a method of using the fixing member 400 of the embodiment. As illustrated in FIG. 24, the light 2 may be hung from a pipe 50 by using two fixing members 400. A first fixing member 400 connects a part of the pipe 50, which is an example of the subject S, and the fixing part 18. One of light holding parts 410 of the first fixing member 400 holds the pipe 50, and the other light holding part 410 holds the fixing part 18. A second fixing member 400 connects a part of the pipe 50 and the fixing part 19. One of light holding parts 410 of the second fixing member 400 holds the pipe 50, and the other light holding part 410 holds the fixing part 19.

Figure 25:
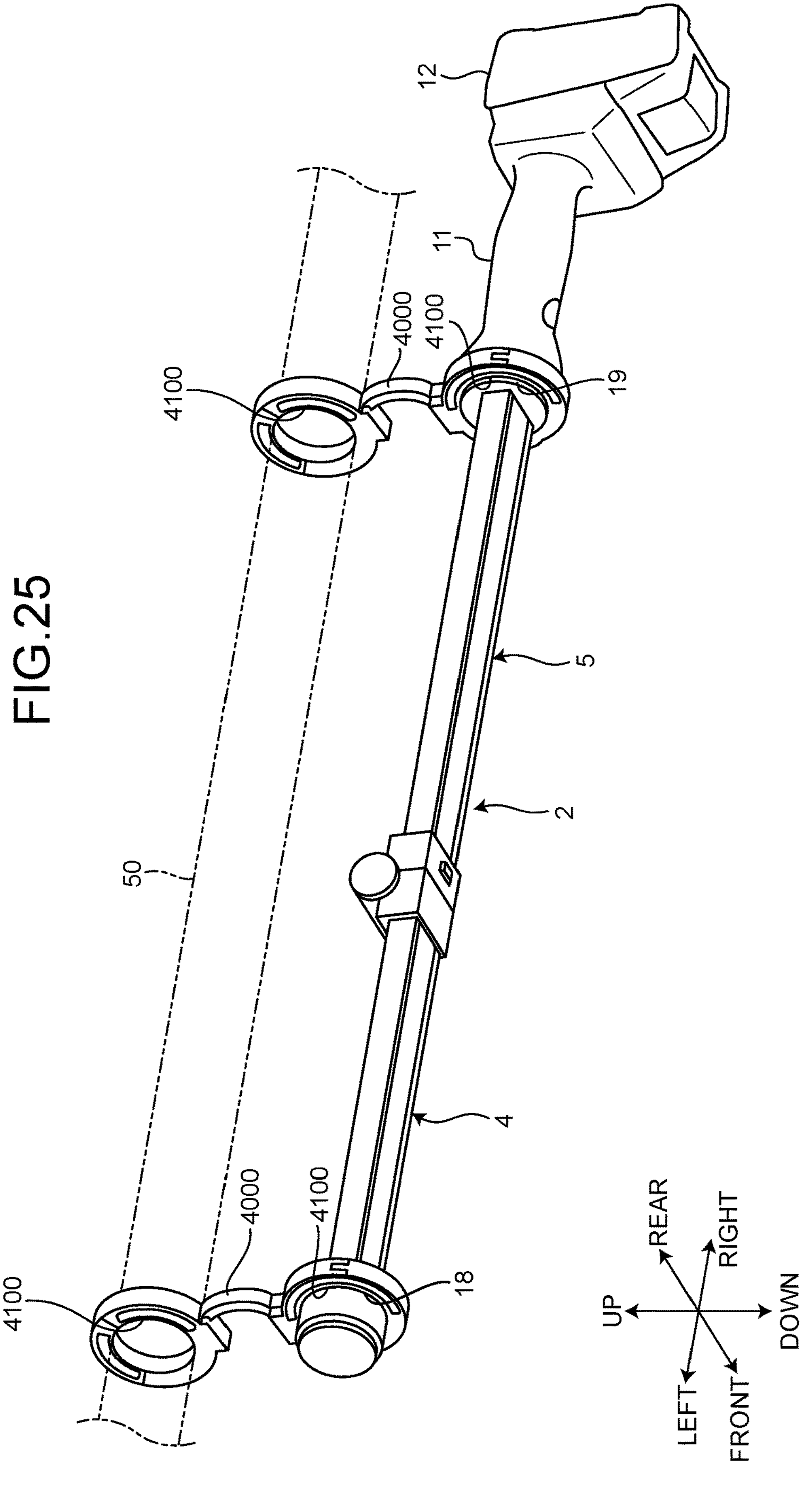
FIG. 25 is a diagram illustrating an example of a method of using the fixing member of the embodiment.

FIG. 25 is a diagram illustrating an example of a method of using fixing members 4000 of the embodiment. As illustrated in FIG. 25, the light 2 may be hung from the pipe 50 by using two fixing members 4000. A first fixing member 4000 connects a part of the pipe 50 and the fixing part 18. One of light holding parts 4100 of the first fixing member 4000 is disposed around the pipe 50, and the other light holding part 4100 is disposed around the fixing part 18. A second fixing member 4000 connects a part of the pipe 50 and the fixing part 19. One of light holding parts 4100 of the second fixing member 4000 is disposed around the pipe 50, and the other light holding part 4100 is disposed around the fixing part 19.

Switch

Figure 26:
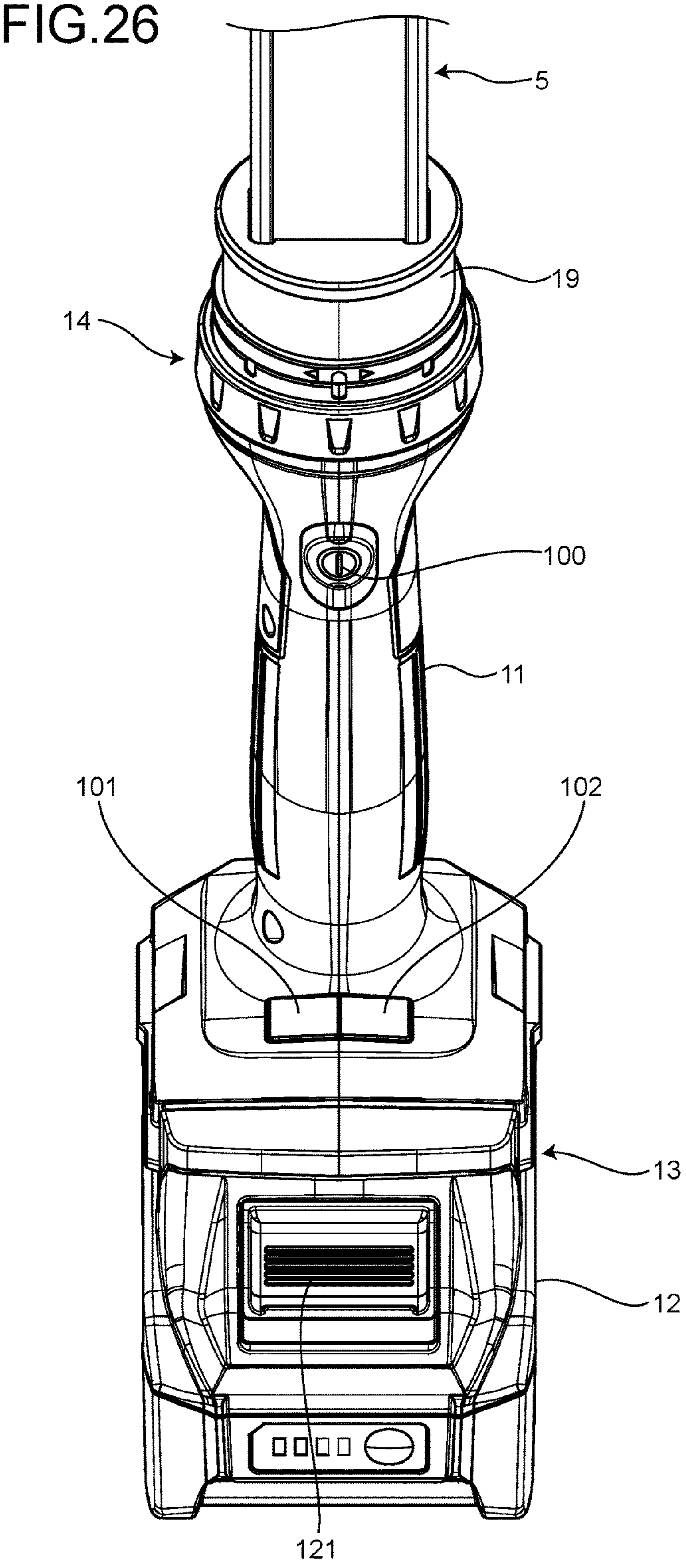
FIG. 26 is a diagram illustrating the handle unit of the light of the embodiment.

FIG. 26 is a diagram illustrating the handle unit 11 of the light 2 of the embodiment. As illustrated in FIG. 26, a main power switch 100, an irradiation mode changeover switch 101, and a color temperature changeover switch 102 are arranged in the handle unit 11.

The main power switch 100 is operated in order to switch on and off the light 2. The main power switch 100 is operated in order to change the luminance of the light 2. When the main power switch 100 is operated once in an off state, the light 2 is turned on in a high luminance mode. When the main power switch 100 is operated once in a state where the light 2 is on in the high luminance mode, the light 2 is turned on in a medium luminance mode. When the main power switch 100 is operated once in a state where the light 2 is on in the medium luminance mode, the light 2 is turned on in a low luminance mode. When the main power switch 100 is operated once in a state where the light 2 is on in the low luminance mode, the light 2 is turned off.

The irradiation mode changeover switch 101 is operated in order to change the irradiation mode of the light 2. The irradiation mode of the light 2 includes an all-on mode in which both the first light unit 4 and the second light unit 5 are turned on, a first half-on mode in which the first light unit 4 is turned on and the second light unit 5 is turned off, and a second half-on mode in which the second light unit 5 is turned on and the first light unit 4 is turned off. When the main power switch 100 is operated once in the off state, the light 2 is turned on in an irradiation mode as of the time when the light was turned off last time. For example, when the main power switch 100 is operated in order to turn on the light 2 after the main power switch 100 has been operated to turn off the light 2 in the all-on mode, the light 2 is turned on in the all-on mode. When the irradiation mode changeover switch 101 is operated once in the all-on mode, the light 2 is turned on in the second half-on mode. When the irradiation mode changeover switch 101 is operated once in the second half-on mode, the light 2 is turned on in the first half-on mode. When the irradiation mode changeover switch 101 is operated once in the first half-on mode, the light 2 is turned on in the all-on mode.

The color temperature changeover switch 102 is operated in order to change the color temperature of light emitted from the light 2. The color temperature of the light emitted from the light 2 includes daylight white, a warm color, and an intermediate color. When the main power switch 100 is operated once in the off state, light having a color temperature as of the time when the light was turned off last time is emitted from the light 2. For example, when the main power switch 100 is operated to turn off the light 2 in a state where the light 2 emits daylight white light and then the main power switch 100 is operated to turn on the light 2, the color temperature of the light emitted from the light 2 is daylight white. When the irradiation mode changeover switch 101 is operated once in a state where daylight white light is emitted from the light 2, warm light is emitted from the light 2. When the irradiation mode changeover switch 101 is operated once in a state where warm color light is emitted from the light 2, intermediate color light is emitted from the light 2. When the irradiation mode changeover switch 101 is operated once in a state where intermediate color light is emitted from the light 2, daylight white light is emitted from the light 2.

Effects

As described above, in the embodiment, the illumination system 1 includes the light 2 and the holder 3. The light 2 includes: the illumination part 7 and the illumination part 9 from which light is emitted; the fixing part 18 connected to the illumination part 7 and the fixing part 19 connected to the illumination part 9; and the battery mounting part 13 to and from which the battery pack 12 is attached and detached. The holder 3 includes: the holder body 15; the attachment parts 16 connected to the holder body 15 and to be attached to the subject S; and the annular clamp units 17 each connected to the holder body 15 and respectively arranged around the fixing parts 18 and 19.

In the above structure, since the clamp units 17 of the holder 3 are annular, the clamp units 17 are respectively arranged around the fixing parts 18 and 19 of the light 2. As a result, the holder 3 can stably hold the light 2 that is heavy in weight when the battery pack 12 is attached.

In the embodiment, the fixing parts 18 and 19 of the light 2 are respectively connected to ends of the illumination parts 7 and 9.

In the above structure, the light emitted from the illumination parts 7 and 9 is prevented from being blocked by the fixing parts 18 and 19.

In the embodiment, the light 2 include the handle unit 11. The fixing part 18 is connected to the illumination part 7, and the fixing part 19 is connected to the illumination part 9. Among the fixing parts 18 and 19, at least the fixing part 19 is disposed between the illumination part 9 and the handle unit 11.

In the above structure, a user can grip the handle unit 11 while the fixing part 19 of the light 2 is held by the clamp units 17 of the holder 3.

In the embodiment, the clamp unit 17 includes the base part 171, the arm 173, the lock lever 174, and the spring 175. The base part 171 is to be disposed at a part of the circumference of the fixing part 18 or 19. The arm 173 is turnably connected to one end of the base part 171. The lock lever 174 is movably supported by the other end of the base part 171. The lock lever 174 locks the arm 173. The spring 175 applies an elastic force to the lock lever 174. The lock lever 174 is movable between the lock position Pa at which the arm 173 is locked and the release position Pb at which the arm 173 is unlocked. The spring 175 applies the elastic force to the lock lever 174 in such a manner that the lock lever 174 moves toward the lock position Pa.

In the above structure, with the lock lever 174 operated so as to move from the lock position Pa to the release position Pb against the elastic force of the spring 175, the lock of the arm 173 is released, and the opening of the base part 171 is opened. The user can insert the fixing part 18 or 19 into the base part 171 or remove the fixing part 18 or 19 from the base part 171 via the opening of the base part 171. In order that the fixing part 18 or 19 is held by the clamp unit 17, the arm 173 is operated so as to be pushed into the base part 171 after the fixing part 18 or 19 is inserted into the base part 171. With the arm 173 operated so as to be pushed into the base part 171, the lock lever 174 is pushed together with the arm 173 toward the release position Pb. Since the spring 175 applies the elastic force to the lock lever 174 in such a manner that the lock lever 174 moves toward the lock position Pa, the lock lever 174 is pushed toward the release position Pb together with the arm 173 and then moves toward the lock position Pa by the elastic force of the spring 175. As a result, the arm 173 is automatically locked by the lock lever 174.

In the embodiment, the light 2 includes the rotation unit 14 that connects the illumination parts 7 and 9 to the battery mounting part 13 in a relatively rotatable manner.

In the above structure, the orientation of the illumination parts 7 and 9 can be changed without changing the orientation of the battery pack 12. The emission direction of light emitted from the illumination parts 7 and 9 can be changed without changing the orientation of the battery pack 12.

In the embodiment, the attachment parts 16 of the holder 3 includes the first attachment part 16A and the second attachment part 16B. The holder 3 includes the extendable unit 20 that connects the first attachment part 16A and the second attachment part 16B in a relatively movable manner.

In the above structure, since the relative distance between the first attachment part 16A and the second attachment part 16B can be changed, the first attachment part 16A and the second attachment part 16B can be attached to subjects S of various sizes.

In the embodiment, the light 2 includes: the first light unit 4 including the illumination part 7 and the fixing part 18; the second light unit 5 including the illumination part 9, the fixing part 19, and the battery mounting part 13; and the bent unit 6 that connects the first light unit 4 and the second light unit 5 in a relatively turnable manner.

In the above structure, the first light unit 4 and the second light unit 5 turn relatively to each other, and thus the light 2 can be used in various use forms.

In the embodiment, the battery pack 12 is attached to and detached from the battery mounting part 13 by being moved in a direction parallel to the predetermined attachment/detachment axis DX with respect to the battery mounting part 13. The rotation axis CX of the rotation unit 14 and the attachment/detachment axis DX are orthogonal to each other.

In the above structure, for example, even when the rotation angle of the rotation unit 14 changes, the battery pack 12 can be smoothly attached to and detached from the battery mounting part 13.

In the embodiment, the battery pack 12 is attached to and detached from the battery mounting part 13 by being moved in a direction parallel to the predetermined attachment/detachment axis DX with respect to the battery mounting part 13. The turning axis AX of the bent unit 6 and the attachment/detachment axis DX are orthogonal to each other.

In the above structure, for example, even when the turning angle of the bent unit 6 changes, the battery pack 12 can be smoothly attached to and detached from the battery mounting part 13.

In the embodiment, the light 2 includes: the first light unit 4 including the illumination part 7 and the fixing part 18; the second light unit 5 including the illumination part 9, the fixing part 19, the battery mounting part 13, and the handle unit 11; and the bent unit 6 that connects the first light unit 4 and the second light unit 5 in a relatively turnable manner. The strap hooks 24, 27, and 25 may be provided to the non-illumination part 8 of the first light unit 4 including the fixing part 18, the bent unit 6, and the handle unit 11, respectively.

In the above structure, since the light 2 is provided with the strap hooks 24, 27, and 25, the straps 23 and 26 can be hooked on the light 2. Further, since the strap hooks 24, 27, and 25 are provided to (i) the non-illumination part 8 of the first light unit 4, (ii) the bent unit 6, and (iii) the handle unit 11, respectively, the straps 23 and 26 can be hooked to the light 2 in various use forms.

In the embodiment, the light 2 includes: the non-illumination part 8 connected to the end of the illumination part 7; and the suspension hook 28 turnably connected to the non-illumination part 8.

In the above structure, the light 2 can be hung from the subject S.

In the embodiment, the light 2 includes flange parts 18F and 19F provided at both ends of the fixing parts 18 and 19.

In the above structure, the fixing parts 18 and 19 and the clamp units 17 are positioned by the clamp units 17 arranged around the fixing parts 18 and 19 abutting on the flange parts 18F and 19F. Moreover, the clamp units 17 are hardly detached from the fixing parts 18 and 19.

In the embodiment, the illumination system 1 includes the fixing member 40, 400, or 4000 that fixes the light 2 and the tripod 30. Each of the fixing members 40, 400 and 4000 fixes the light 2 hung on the bar 33 which is the first portion of the tripod 30 and the pole 32 which is the second portion of the tripod 30. The fixing members 40, 400, and 4000 include: the light holding parts 41, 410, and 4100, respectively, that hold at least a part of the light 2 having the suspension hook 28 hung on the bar 33 of the tripod 30; and the tripod attaching parts 42, 420, and 4200, respectively, to be attached to the pole 32 of the tripod 30.

In the above structure, the long lights 2 can be stably hung on the tripod 30. The fixing members 40, 400, and 4000 suppresses swinging of the light 2 hung on the bar 33 of the tripod 30.

In the embodiment, the tripod attaching parts 42, 420, and 4200 include tripod openings 42M, 420M, and 4200M, respectively, into which the pole 32 is inserted.

In the above structure, since tripod attaching parts 42, 420, and 4200 include a recess including the tripod openings 42M, 420M, and 4200M, respectively, the pole 32 can be easily attached to and detached from the tripod attaching parts 42, 420, and 4200.

In the embodiment, the light 2 includes: the illumination part 9 from which light is emitted; and the fixing part 19 connected to an end of the illumination part 9. The light holding parts 41 and 410 include the light openings 41M and 410M, respectively, into which the fixing part 19 is inserted.

In the above structure, since the light holding parts 41 and 410 include the recess including the light openings 41M and 410M, respectively, the fixing part 19 of the light 2 can be easily attached to and detached from the light holding parts 41 and 410.

In the embodiment, the light 2 includes: the illumination part 9 from which light is emitted; and the fixing part 19 connected to an end of the illumination part 9. The light holding part 4100 has an annular shape surrounding the fixing part 19.

In the above structure, since the light holding part 4100 has an annular shape surrounding the fixing part 19 of the light 2, the fixing part 19 of the light 2 hardly comes off from the light holding part 4100.

In the embodiment, a light holding part 4100 includes: the base part 4101 to be disposed at a part of the circumference of the fixing part 19; the arm 4103 turnably connected to one end of the base part 4101; a lock lever 4104 that is movably supported by the other end of the base part 4101 and is capable of locking the arm 4103; and the spring that applies an elastic force to the lock lever 4104. The lock lever 4104 is movable between a lock position at which the arm 4103 is locked and a release position at which the arm 4103 is unlocked. The spring applies the elastic force to the lock lever 4104 in such a manner that the lock lever 4104 moves toward the lock position.

In the above structure, with the lock lever 4104 operated so as to move from the lock position to the release position against the elastic force of the spring, the lock of the arm 4103 is released, and an opening of the base part 4101 is opened. The user can insert the fixing part 19 into the base part 4101 or remove the fixing part 19 from the base part 4101 via the opening of the base part 4101. In order that the fixing part 19 is held by the light holding part 4100, the arm 4103 is operated so as to be pushed into the base part 4101 after the fixing part 19 is inserted into the base part 4101. With the arm 4103 operated so as to be pushed into the base part 4101, the lock lever 4104 is pushed together with the arm 4103 toward the release position. Since the spring applies the elastic force to the lock lever 4104 in such a manner that the lock lever 4104 moves toward the lock position, the lock lever 4104 is pushed toward the release position together with the arm 4103 and then moves toward the lock position by the elastic force of the spring. As a result, the arm 4103 is automatically locked by the lock lever 4104.

In the embodiment, a plurality of the light holding parts 41, 410 or 4100 are provided.

In the above structure, a plurality of lights 2 and the tripod 30 can be simultaneously fixed.

In the embodiment, the light holding parts 41, 410, and 4100 are arranged on both sides of the tripod attaching parts 42, 420, and 4200, respectively.

In the above structure, the plurality of lights 2 arranged on both sides of the tripod 30 and the tripod 30 can be simultaneously fixed.

In the embodiment, the light opening 410M of the first light holding part 410 and the light opening 410M of the second light holding part 410 face in mutually opposite directions. The tripod opening 420M of the tripod attaching part 420 faces in a direction different from the light opening 410M of the first light holding part 410 and the light opening 410M of the second light holding part 410.

In the above structure, it is possible to smoothly perform attachment and detachment of the tripod 30 and attachment and detachment of the plurality of lights 2 to and from the fixing member 400.

In the embodiment, the light 2 includes: the illumination parts 7 and 9 from which light is emitted; the non-illumination part 8 that is the first non-illumination part connected to one end of the illumination part 7; and the non-illumination part 10 that is the second non-illumination part connected to the other end of the illumination part 9. The suspension hook 28 is connected to the non-illumination part 8. The light holding parts 41, 410, and 4100 hold the fixing part 19 provided in the non-illumination part 10.

In the above structure, the upper end of the light 2 is hung from the bar 33 of the tripod 30, and the lower portion of the light 2 is fixed to the pole 32 of the tripod 30 by the fixing member 40, 400, or 4000, and thus the light 2 hung from the bar 33 of the tripod 30 is prevented from swinging.

In the embodiment, the light 2 has the handle unit 11. Each of the light holding parts 41, 410, and 4100 holds the fixing part 19 disposed between the illumination part 9 and the handle unit 11.

In the above structure, the user can grip the handle unit 11 while the fixing part 19 of the light 2 is held by the light holding part 41, 410, or 4100 of the fixing member 40, 400, or 4000, respectively.

In the embodiment, the light 2 includes the flange parts 19F provided at both ends of the fixing part 19. Each of the light holding part 41, 410, and 4100 holds the fixing part 19 between one of the flange parts 19F and the other flange part 19F.

In the above structure, the fixing part 19 and the fixing member 40, 400, or 4000 are positioned with the light holding parts 41, 410, or 4100, respectively, which are disposed around the fixing part 19, abutting on the flange parts 19F. Moreover, the fixing members 40, 400, and 4000 hardly come off from the fixing part 19.

In the embodiment, the light 2 includes the battery mounting part 13 which is provided at one end of the handle unit 11 and to and from which the battery pack 12 is attached and detached. Each of the light holding parts 41, 410, and 4100 holds the fixing part 19 connected to the other end of the handle unit 11.

In the above structure, the user can grip the handle unit 11 or attach and detach the battery pack 12 to and from the battery mounting part 13 in a state where the fixing part 19 of the light 2 is held by the light holding parts 41, 410, or 4100 of the fixing member 40, 400, or 4000, respectively.

Other Embodiments

In the above embodiment, the clamp units 17 may be configured to be movable in the longitudinal direction of the holder body 15 with respect to the holder body 15. For example, in FIG. 2, the clamp units 17 may be movable in the left-right direction with respect to the holder body 15. The distance between the first clamp unit 17A and the second clamp unit 17B may be adjustable in the left-right direction.

In the embodiment, the clamp units 17 and the holder body 15 are fixed by the screw 177. No screw hole may be included in the holder body 15. The clamp unit 17 and the holder body 15 may be fixed using an adhesive, a tapping screw, a magnet, or the like.

In the embodiment, the light 2 may not include the handle unit 11. The light 2 may be configured such that the battery mounting part 13 is connected with the rotation unit 14, and the illumination part 9 and the battery mounting part 13 is relatively turnable.

In the embodiment, the clamp units 17 may be configured to be detachable from the holder body 15.

In the embodiment, the fixing part 19 of the light 2 held by the light holding parts 41, 410, and 4100 of the fixing members 40, 400, and 4000, respectively, may have a cylindrical shape. Moreover, the diameter of the fixing part 19 and the diameter of the pipe 50 may be substantially the same.

In the embodiment, each of the fixing members 40, 400, and 4000 includes two light holding parts 41, 410, and 4100, respectively. Among two light holding parts, the size (inner diameter) of a first light holding part and the size (inner diameter) of a second light holding part may be different, and the structure of the first light holding part and the structure of the second light holding part may be different. For example, the first light holding part may have a size and a structure suitable for holding the fixing part 19, and the second light holding part may have a size and a structure suitable for the pipe 50 or other structures. The second light holding part may be, for example, a strap or a belt.

As described with reference to FIG. 20, the light 2 may be hung on the tripod 30. The subject on which the light 2 is hung may be various types of self-standing stands such as a stand that is used by being inserted into the ground.

According to the techniques disclosed herein, a light is stably held.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An illumination system comprising:

a light including: an illumination part from which light is emitted; a fixing part connected to the illumination part; and a battery mounting part to and from which a battery pack is attached and detached; and a holder including: a holder body; an attachment part connected to the holder body and to be attached to a subject; and a clamp unit connected to the holder body and disposed around the fixing part, wherein the light includes a rotation unit that connects the illumination part and the battery mounting part in a relatively rotatable manner.

2. The illumination system according to claim 1, wherein the fixing part is connected to an end of the illumination part.

3. The illumination system according to claim 2, wherein a plurality of the fixing parts are provided, the light includes a handle unit, the fixing parts are connected to the illumination part, and at least one of the fixing parts is disposed between the illumination part and the handle unit.

4. The illumination system according to claim 2, wherein the clamp unit is annular and includes:

a base part to be disposed at a part of a circumference of the fixing part;

an arm turnably connected to a first end of the base part;

a lock lever that is movably supported by a second end of the base part and is capable of locking the arm; and a spring that applies an elastic force to the lock lever, the lock lever is movable between a lock position at which the arm is locked and a release position at which the arm is unlocked, and the spring applies the elastic force to the lock lever in such a manner that the lock lever moves toward the lock position.

5. The illumination system according to claim 1, wherein the attachment part includes a first attachment part and a second attachment part, and the holder includes an extendable unit that connects the first attachment part and the second attachment part in a relatively movable manner.

6. The illumination system according to claim 1, wherein the illumination part includes a first illumination part and a second illumination part, the fixing part includes a first fixing part and a second fixing part, the light includes:

a first light unit including the first illumination part and the first fixing part;

a second light unit including the second illumination part, the second fixing part, and the battery mounting part; and a bent unit that connects the first light unit and the second light unit in a relatively turnable manner.

7. The illumination system according to claim 6, wherein the battery pack is attached to and detached from the battery mounting part by being moved in a direction parallel to a predetermined attachment/detachment axis with respect to the battery mounting part, and a turning axis of the bent unit and the attachment/detachment axis are orthogonal to each other.

8. The illumination system according to claim 1, wherein the battery pack is attached to and detached from the battery mounting part by being moved in a direction parallel to a predetermined attachment/detachment axis with respect to the battery mounting part, and a rotation axis of the rotation unit and the attachment/detachment axis are orthogonal to each other.

9. The illumination system according to claim 1, wherein the illumination part includes a first illumination part and a second illumination part, the fixing part includes a first fixing part and a second fixing part, the light includes:

a first light unit including the first illumination part and the first fixing part;

a second light unit including the second illumination part, the second fixing part, the battery mounting part, and a handle unit; and a bent unit that connects the first light unit and the second light unit in a relatively turnable manner, and a strap hook is provided to each of (i) a non-illumination part of the first light unit including the fixing part, (ii) the bent unit, and (iii) the handle unit.

10. A light to be held by a holder, the light comprising:

an illumination part from which light is emitted;

a battery mounting part to and from which a battery pack is attached and detached;

a fixing part connected to the illumination part and to be held by a clamp unit provided in a holder, the holder being for holding the light and having an attachment part to be attached to a subject; and a rotation unit that connects the illumination part and the battery mounting part coaxially with a rotation axis of the rotation unit in a relatively rotatable manner about the rotation axis, wherein the battery pack is attached to and detached from the battery mounting part by being moved in a direction parallel to a predetermined attachment/detachment axis with respect to the battery mounting part, and the rotation axis and the attachment/detachment axis are orthogonal to each other.

11. The light according to claim 10, further comprising:

a handle unit, wherein a plurality of the fixing parts are provided, the fixing parts are connected to the illumination part, and at least one of the fixing parts is disposed between the illumination part and the handle unit.

12. The light according to claim 10, wherein the illumination part includes a first illumination part and a second illumination part, the fixing part includes a first fixing part and a second fixing part, the light includes:

a first light unit including the first illumination part and the first fixing part;

a second light unit including the second illumination part, the second fixing part, and the battery mounting part; and a bent unit that connects the first light unit and the second light unit in a relatively turnable manner.

13. The light according to claim 12, wherein a turning axis of the bent unit and the attachment/detachment axis are orthogonal to each other.

14. The light according to claim 10, wherein the illumination part includes a first illumination part and a second illumination part, the fixing part includes a first fixing part and a second fixing part, the light includes:

a first light unit including the first illumination part and the first fixing part;

a second light unit including the second illumination part, the second fixing part, the battery mounting part, and a handle unit; and a bent unit that connects the first light unit and the second light unit in a relatively turnable manner, and a strap hook is provided on each of (i) a non-illumination part of the first light unit including the fixing part, (ii) the bent unit, and (iii) the handle unit.

15. A holder for holding a light, the holder comprising:

a holder body;

an attachment part connected to the holder body and to be attached to a subject; and a clamp unit that is connected to the holder body and holds at least a part of the light including a battery mounting part to and from which a battery pack is attached and detached, wherein the attachment part includes a first attachment part and a second attachment part, the holder includes an extendable unit that connects the first attachment part and the second attachment part in a relatively movable manner, the light includes an illumination part from which light is emitted and a fixing part connected to the illumination part, the clamp unit holds the fixing part, the clamp unit includes:

a base part to be disposed at a part of a circumference of the fixing part;

an arm turnably connected to a first end of the base part;

a lock lever that is movably supported by a second end of the base part and is capable of locking the arm; and a spring that applies an elastic force to the lock lever, the lock lever is movable between a lock position at which the arm is locked and a release position at which the arm is unlocked, and the spring applies the elastic force to the lock lever in such a manner that the lock lever moves toward the lock position.

* * * * *